(12) United States Patent
Fritz et al.

(10) Patent No.: US 10,457,588 B2
(45) Date of Patent: Oct. 29, 2019

(54) LEAD-THROUGH OR CONNECTING ELEMENT WITH IMPROVED THERMAL LOADING CAPABILITY

(71) Applicant: SCHOTT AG, Mainz (DE)

(72) Inventors: Oliver Fritz, Obersüßbach (DE); Georg Meier, Obersüßbach (DE); Thomas Fink, Landshut (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 16/163,686

(22) Filed: Oct. 18, 2018

(65) Prior Publication Data

US 2019/0047904 A1 Feb. 14, 2019

Related U.S. Application Data

(60) Division of application No. 15/629,969, filed on Jun. 22, 2017, now Pat. No. 10,138,157, which is a
(Continued)

(30) Foreign Application Priority Data

Dec. 22, 2014 (DE) ............... 10 2014 119 372

(51) Int. Cl.
*C03C 8/24* (2006.01)
*C03C 3/068* (2006.01)
(Continued)

(52) U.S. Cl.
CPC ............ *C03C 8/24* (2013.01); *C03C 3/068* (2013.01); *C03C 4/16* (2013.01); *C03C 10/0036* (2013.01);
(Continued)

(58) Field of Classification Search
CPC ...................................................... C03C 8/24
(Continued)

(56) References Cited

U.S. PATENT DOCUMENTS 3,676,292 A 7/1972 Pryor
4,128,697 A * 12/1978 Simpson .................. C03C 8/24
174/152 GM
(Continued)

FOREIGN PATENT DOCUMENTS

CA 1000353 11/1976
DE 2150092 4/1972
(Continued)

OTHER PUBLICATIONS

English translation of International Search Report dated Apr. 6, 2016 for corresponding PCT/EP2015/080976, 3 pages.
(Continued)

*Primary Examiner* — Stanley Tso
(74) *Attorney, Agent, or Firm* — Ohlandt, Greeley, Ruggiero & Perle, L.L.P.

(57) ABSTRACT

A lead-through or connecting element is provided that includes an assembly having a carrier body of a high-temperature alloy, a functional element, and an at least partially crystallized glass. The crystallized glass is between a portion of the functional element and a portion of the carrier body. The carrier body subjects the crystallized glass to a compressive stress of greater than or equal to zero, at a temperature from at least 20° C. to more than 450° C. Also provided are a method for producing a lead-through or connecting element, the use of such a lead-through or connecting element, and to a measuring device including such a lead-through or connecting element.

13 Claims, 7 Drawing Sheets

Related U.S. Application Data continuation of application No. PCT/EP2015/080976, filed on Dec. 22, 2015.

(51) Int. Cl.
*C03C 10/00* (2006.01)
*C03C 4/16* (2006.01)
*H01B 3/08* (2006.01)
*H01B 17/30* (2006.01)
*H01B 17/58* (2006.01)

(52) U.S. Cl.
CPC ......... *C03C 10/0054* (2013.01); *H01B 3/087* (2013.01); *H01B 17/305* (2013.01); *H01B 17/58* (2013.01); *C03C 2204/00* (2013.01); *H05K 999/99* (2013.01)

(58) Field of Classification Search
USPC ........................................... 174/654
See application file for complete search history.

(56) References Cited

U.S. PATENT DOCUMENTS

| | | |
|---|---|---|
| 4,421,947 A | 12/1983 | Kyle |
| 5,104,755 A * | 4/1992 | Taylor .................. C03C 8/24 174/50.61 |
| 5,203,723 A | 4/1993 | Ritter |
| 8,397,638 B2 | 3/2013 | Fink |
| 2008/0118831 A1* | 5/2008 | Jouanneau-Si-Larbi .................. C03C 27/044 429/188 |
| 2008/0314616 A1 | 12/2008 | Benestad |
| 2010/0078191 A1 | 4/2010 | Nanba |
| 2015/0083487 A1 | 3/2015 | Leedecke |

FOREIGN PATENT DOCUMENTS

| | | |
|---|---|---|
| DE | 102009011182 | 9/2010 |
| DE | 102011012430 | 8/2012 |
| DE | 102014218983 | 3/2015 |
| EP | 0412655 | 2/1991 |
| EP | 2056085 | 5/2009 |
| JP | S60117577 | 8/1985 |
| JP | S63472 | 1/1988 |
| JP | 2008053007 | 3/2008 |
| JP | 2010087139 | 4/2010 |
| JP | 2010262761 | 11/2010 |
| JP | 2011168480 | 9/2011 |

OTHER PUBLICATIONS

English translation of International Preliminary Report on Patentability dated Jul. 6, 2017 for corresponding PCT/EP2015/080976, 7 pages.

* cited by examiner

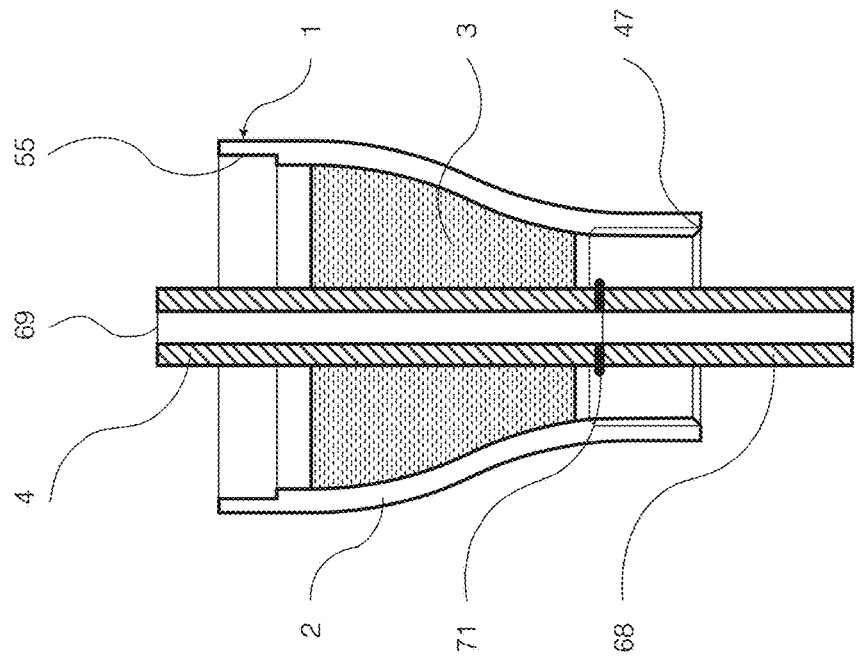
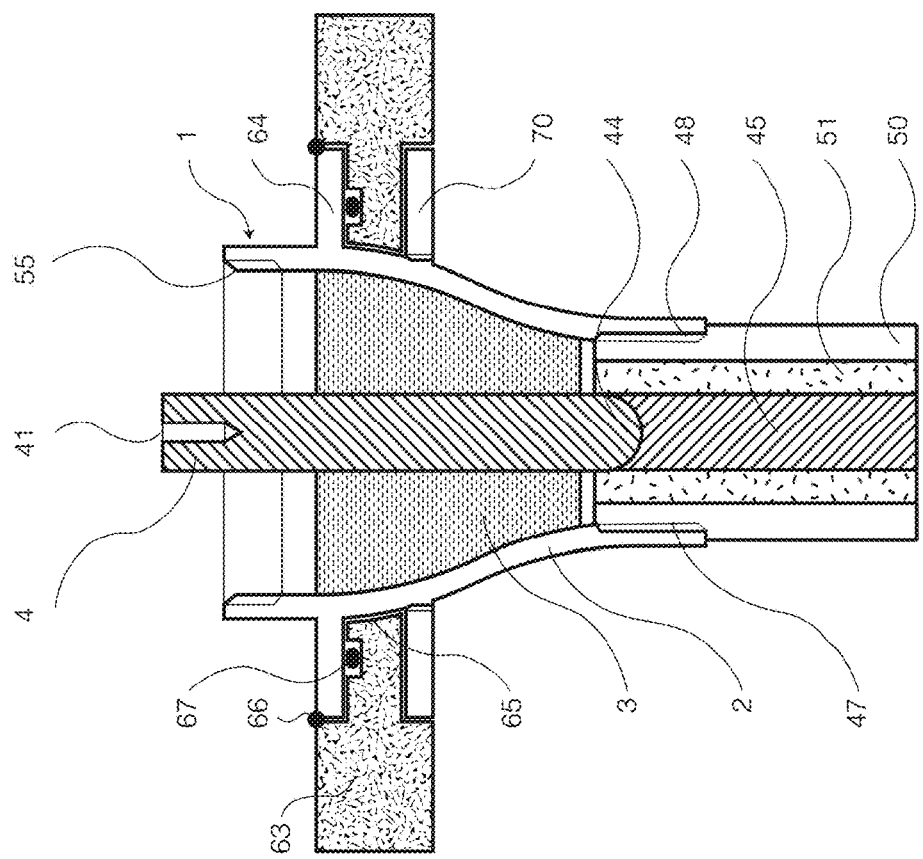

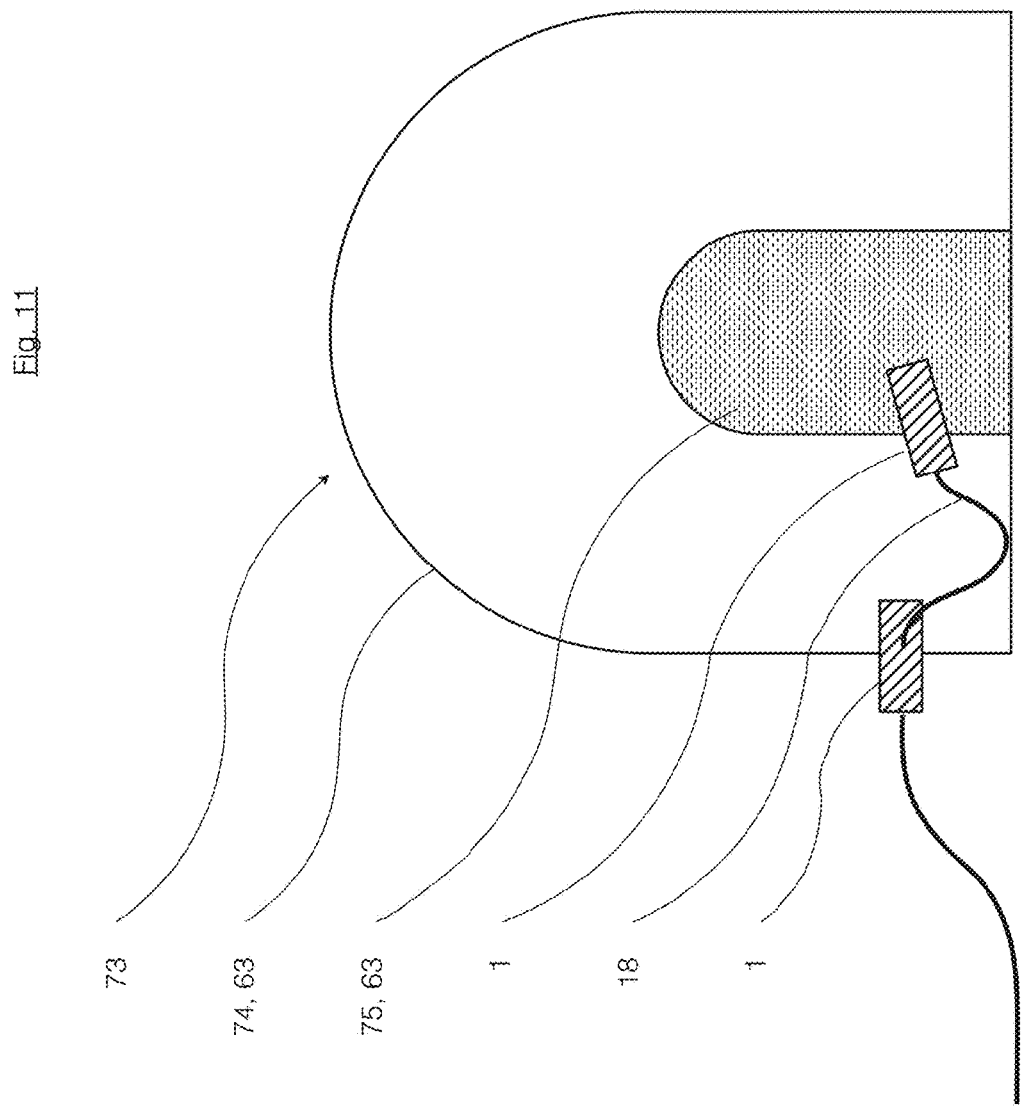

LEAD-THROUGH OR CONNECTING ELEMENT WITH IMPROVED THERMAL LOADING CAPABILITY

CROSS REFERENCE TO RELATED APPLICATIONS

This application is a divisional application of U.S. application Ser. No. 15/629,969 filed on Jun. 22, 2017, which is a continuation of International Application No. PCT/EP2015/080976 filed 22 Dec. 2015, which claims benefit under 35 U.S.C. 119(a) of German Patent Application No. 102014119372.5 filed 22 Dec. 2014, the entire contents of all of which are incorporated herein by reference

BACKGROUND

1. Field of the Disclosure

The present invention generally relates to lead-through or connecting elements, and more particularly to lead-through or connecting elements with high thermal loading capability which can be used in particular under harsh operating conditions, which generally means in harsh environments with high operating or emergency temperatures above 260° C. Advantageous upper limits that can be achieved with the invention are about 950° C., but in particular even 1000° C., 1100° C., and/or 1200° C.

2. Description of Related Art

Lead-through or connecting elements are generally known in the art and form part of many devices. Typically, such lead-through or connecting elements comprise an electrical conductor which is secured in a lead-through opening by means of an electrically insulating material. The parameters characterizing the performance of such lead-through or connecting elements essentially include the electrical resistance of the insulating material, and their resistance to heat and pressure which tend to cause the insulating material and/or the conductor to be ripped out of the lead-through opening.

Although such lead-through or connecting elements are a very suitable technology for instance to feed electrical current through housings of devices, the parameters mentioned above often limit possible application areas for devices that incorporate such lead-through elements. U.S. Pat. No. 5,203,723 A discloses lead-through elements made of a metal pin surrounded by a polymeric material as an electrically insulating material. The geometry of the polymeric material surrounding the electrical conductor is adapted to withstand elevated pressures, by virtue of depressions and protrusions, such as shoulders. The described lead-through elements are used to establish connections within a sonde of a down hole oil well logging tool and can be used at operating temperatures above 260° C. and maximum pressures of 28,000 psi. Volume resistivity of the employed polymers is about $8.0 \times 10^{14}$ Ωcm, and is thus excellent. However, long-term stability of such polymers decreases over time when exposed to elevated operating temperatures, electromagnetic radiation such as UV or gamma radiation, and also to mechanical deterioration due to physical abrasion.

Lead-through elements which comprise an inorganic material such as glass as an electrically insulating material are also known. U.S. Pat. No. 8,397,638 A, for example, describes a lead-through device of an airbag igniter in which the lead-through opening of a metallic support body is sealed by a glass material which furthermore holds a pin as an electrical conductor. Such lead-through elements are adapted to withstand the pressure of the explosive when the igniter is ignited, in which case pressures of approximately 1000 bar corresponding to 14,500 psi can be observed. The electrical properties of the insulating material are not described, but it can be assumed that the volume resistivity of the glass material does not play an important role because the igniter is ignited only once by a short electrical pulse and then the device is destroyed.

Application document DE 10 2014 218 983 previously filed by the assignee of the present application but not yet published at the priority date of the present application, discloses an electrically insulating fixing material which may be a glass. As taught in this application, glass is known as an amorphous material in which crystallites are undesirable. Since the crystallized regions of the glass ceramic typically have a different coefficient of thermal expansion (CTE), the amorphous glass matrix, the concentration of the crystallized regions, and the specific CTE thereof can be used to adapt the overall CTE of the glass ceramic material. However, it is furthermore stated in this previously filed application that an amorphous glass material is just as suitable as the glass ceramic material, and temperature ranges of about 260° C. and 350° C. are mentioned.

Often, however, greater temperature ranges than those mentioned above are advantageous.

SUMMARY

The object of providing greater operating temperature ranges is achieved by a lead-through or connecting element according to the present disclosure.

The inventors have found that a combination of a crystallized or at least partially crystallized glass and a high-temperature alloy allows to provide excellent CTE ratios with high stability over a very wide range of operating temperatures, in particular far beyond the temperature range mentioned in DE 10 2014 218 983. The term 'at least partially crystallized glass' generally refers to an at least a partially crystallized glass-based material. This includes both glass ceramics which, according to conventional understanding, include a crystal content from 50% to 90% by volume, but also materials which are crystallized to 100% or nearly 100%, i.e. in which the crystal content is up to 100% or nearly 100% by volume.

In particular, the lead-through or connecting elements of the present invention are even capable of withstanding operating and/or incident pressures above 42,000 psi. Therefore, they can be used in numerous applications, in particular in power generation reactors, such as nuclear reactors, in particular within the containments thereof, or as feedthroughs extending across the containments thereof, and in underground and/or exploration drilling tools, and for safe encapsulation of toxic matter, and in spacecraft. Thus, particularly advantageous applications are feedthroughs in the primary circuit of a nuclear reactor, for example feedthroughs through the pressure vessel of the reactor, in particular for feeding electrical power to the control rods.

Advantageously, a lead-through or connecting element that comprises an assembly consisting of a carrier body comprising a high-temperature alloy, preferably a functional element, and an at least partially crystallized glass, with the at least partially crystallized glass preferably arranged between a portion of the functional element and a portion of the carrier body or within at least one portion of the carrier body, is embodied according to the invention so that the carrier body comprising the high-temperature alloy subjects the at least partially crystallized glass 3 to a compressive stress of greater than or substantially equal to zero at a temperature from at least 20° C. up to more than 450° C. This compressive stress essentially ensures that there will be no detachment of the carrier body from the at least partially crystallized glass and preferably no detachment of the at least partially crystallized glass from the functional element in the event of a temperature rise, at least in a range from at least 20° C. to more than 450° C. This can be very advantageous, for example in embodiments in which additional means ensure that the functional element is reliably retained mechanically. Even if further means are provided which serve to reduce the pressure exerted on the at least partially crystallized glass, such as for example by further functional units, in particular pressure-shielding functional units which are arranged on the lead-through or connecting element.

In particular and also preferred embodiments, the lead-through or connecting element of the present invention requires no additional functional element, for example if optical, acoustic, and/or electromagnetic signals are passed through the body of the at least partially crystallized glass itself. In such a case, with suitable thicknesses of the at least partially crystallized glass adapted to the particular application, sufficiently strong signals can be passed therethrough, even if the at least partially crystallized glass has a dampening or scattering effect on the signal transport. For example, spectral measurements can provide information about thermal conditions or about the presence of certain chemical substances. Their behavior over time can furthermore be exploited to detect heating, for example, and also reaction-kinetic processes.

Piezoelectric actuators and/or sensors which are arranged on the at least partially crystallizable glass on both sides in the axial direction in each case, for example, can be used to transmit acoustic signals, for example for underwater applications.

In addition or alternatively, capacitive and/or inductive coupling moreover allows to transfer complex signal forms uni- or bi-directionally, for example for signal transport in control and/or monitoring processes.

In applications with a thermal load, the at least partially crystallizable glass may be caused to further crystallize, so that the degree of crystallization thereof increases and in particular also increases further locally in particularly temperature-loaded regions. As a result, additional operational safety can be provided, for example in the sense of an emergency reserve. An alteration in the opacity or scattering behavior associated with long-term operation over several weeks to years, for example, which is due to increasing crystallization, may moreover serve as a measure of the thermal load experienced during the long-term operation.

It is furthermore advantageous if the carrier body comprising the high-temperature alloy subjects the at least partially crystallized glass 3 to a compressive stress of greater than or substantially equal to zero preferably at a temperature from at least 20° C. to more than 550° C., more preferably at a temperature from at least 20° C. to more than 650° C., and yet more preferably at a temperature from at least 10° C. to more than 750° C., and most preferably at a temperature from at least 10° C. to more than 900° C. Consequently, as long as this compressive stress is maintained, it can be ensured that the lead-through or connecting element is hermetically sealed in these temperature ranges, for example by the measures mentioned above or further below in the description.

In a particularly preferred embodiment, the carrier body comprising the high-temperature alloy exerts a compressive stress of greater than or substantially equal to zero preferably at a temperature from at least 10° C. up to the crystallization temperature $T_K$ of the at least partially crystallized glass, which allows to substantially permanently ensure that the hermeticity of the lead-through or connecting element is not impaired. Since for many at least partially crystallizable glasses the crystallization temperature may be very much higher than for instance softening temperatures of glasses conventionally used for compression glass seals, it is possible to achieve significantly higher operating temperatures in this way. Advantageous upper limits which can be achieved with the invention are about 950° C., but in particular also 1000° C., 1100° C., and/or 1200° C.

Another very important temperature is the inversion temperature. The inversion temperature is the temperature at which, in the case of a compression glass seal, the compressive stress exerted by the metallic carrier element on the glass material reverses into a tensile stress. Thus, the inversion temperature is a measure for the maximum operating temperature of a compression glass seal, since the latter is able to tolerate tensile stresses only in a small range without the compression glass seal becoming damaged. Thus, the inversion temperature describes, so to speak, the point of intersection of the superimposed curves of thermal expansion of the metallic carrier element and of the insulating body made of glass material.

For the present invention, the inversion temperature has the further significance that the inversion temperature is not necessarily the temperature at which the at least partially crystallizable glass begins to fit against and fuse to the carrier body of the lead-through and connecting element during the manufacturing of the lead-through and connecting element, since the crystallization temperature which is also referred to as temperature $T_K$ may differ from the temperature at which the at least partially crystallizable or at least partially crystallized starting material fuses to the carrier body and at which the at least partially crystallizable or at least partially crystallized starting material fuses to the functional element.

If the crystallization temperature and the glass sealing temperature, i.e. the temperature at which the glass fuses to the carrier body are different, the inversion temperature essentially corresponds to the crystallization temperature. If mechanical forces which may act on the functional element are absorbed by further means, as will be described in more detail further below in the description, it is even possible to implement operating temperatures up to the inversion temperature and even beyond, as will be described below. In this case, the maximum operating temperature may substantially correspond to the inversion temperature of the lead-through or connecting element, with a deviation of +/−20%, the inversion temperature being the temperature at which the compressive stress exerted by the carrier body on the at least partially crystallized glass material assumes the value of zero, and the maximum operating temperature, for example in case of the preferred at least partially crystallized glasses, is in a range of more than 450° C., in particular up to 950° C., and preferably up to 1000° C. or more, more preferably up to 1100° C., most preferably up to 1200° C.

In a preferred embodiment, the thermal expansion coefficient $CTE_G$ of the at least partially crystallized glass is generally smaller than the thermal expansion coefficient $CTE_H$ of the material of the carrier body, and, if the material of the carrier body is made of a high-temperature alloy, smaller than the thermal expansion coefficient of the high-temperature alloy, by a factor $F_{CTE}$ which is greater than 1.06, except for a deviation of about 5%, and that at a temperature from at least 20° C. to more than 450° C., preferably at a temperature from at least 20° C. to more than 550° C., more preferably at a temperature from at least 20° C. to more than 650° C., at a temperature from at least 10° C. to more than 750° C., and more preferably at a temperature of more than 900° C., advantageously at a temperature of more than 950° C. If the carrier body consists of a high-temperature alloy and further materials, the thermal expansion coefficient $CTE_H$ indicates the overall thermal expansion coefficient of the material of the carrier body consisting of the high-temperature alloy and these further materials. For example, a ceramic material may likewise be used as the material of the carrier body, also in a compound comprising a high-temperature alloy. Furthermore, herein, the coefficient of thermal expansion $CTE_G$ indicates the thermal expansion coefficient of the respective at least partially crystallized glass and thus comprises the glassy phase thereof as well as all at least partially crystallized and also crystallized phases and combinations thereof. The thermal expansion coefficient $CTE_G$ may be a function of temperature and may moreover vary in its value as a function of the proportion of crystallites.

Preferably, the factor $F_{CTE}$ has a value which is in a range from 1.06 to 3.5. For the purposes of the invention, this advantageously has the effect that the compressive stress exerted by the carrier body on the at least partially crystallized glass is constant in the temperature ranges mentioned above, in particular just up to the inversion temperature, with a limited range of variation. Thereby it is ensured in excellent manner that the at least partially crystallized glass is reliably held in the carrier body up to the maximum operating temperature.

It is surprisingly advantageous for a lead-through or connecting element if the at least partially crystallized glass is a partially crystallized glass which includes at least one crystal phase and at least one amorphous residual glass phase with a glass transition temperature $T_g$, wherein in the operating state and/or in the event of an incident the lead-through or connecting element is exposed to temperatures greater than $T_g$. It has been found that, surprisingly, the partially crystallized material is not pressed out of the carrier body by the compressive stress and/or in particular the ambient conditions, and that the compressive stress is maintained. It is assumed that this is due to the fact that in particular the body made of the at least partially crystallized glass does not or not substantially deform. In addition, chemical bonds between the at least partially crystallized material and the body, which are produced in particular during the manufacturing process, in particular during melting, may contribute to the pressure resistance. It is thus possible to achieve operating temperature ranges which are significantly above the softening temperature of the glassy phase of the at least partially crystallizable glass. Although, as expected, the glassy phase of the at least partially crystallized glass is not able to provide any mechanical stability, strength values were nevertheless observed which were completely unexpected.

In preferred embodiments of the lead-through or connecting element, the temperature which the lead-through or connecting element is subjected to in the operating state and/or in the event of an incident can be more than 650° C., preferably even between 700° C. and 1200° C.

In a particularly preferred embodiment, the at least partially crystallized glass is a glass or a glass ceramic or a glass-based crystallized material with a volume resistivity of more than $1.0 \times 10^{10}$ Ωcm at a temperature of 350° C., and the glass or the glass ceramic or the glass-based crystallized material contains the following components on an oxide basis, in mol %:
$SiO_2$ 25-55
$B_2O_3$ 0.1-15
$Al_2O_3$ 0-15
MO 20-50
$M_2O$ 0-<2,
wherein MO is selected from the group consisting of MgO, CaO, SrO, BaO, individually or in any combination thereof, and wherein $M_2O$ is selected from the group consisting of $Li_2O$, $Na_2O$, $K_2O$, individually or in any combination thereof.

In the most preferred embodiment, the at least partially crystallized glass has the composition given below, with a volume resistivity that is also given:

| Composition [mol %] | |
|---|---|
| $SiO_2$ | 38.7 |
| $B_2O_3$ | 8.9 |
| $Al_2O_3$ | 1.6 |
| BaO | 0.0 |
| CaO | 36.7 |
| MgO | 6.7 |
| $Y_2O_3$ | 3.4 |
| $ZrO_2$ | 4.0 |
| Volume resistivity at 350° C. [Ω cm] | $3.9 \times 10^{11}$ |

All values of the above composition are given in mole percent on an oxide basis. Likewise preferred variations correspond to this composition with an individual variation of the individual components of +/−20% calculated from the content of the respective component of the described embodiment.

Another preferred lead-through or connecting element comprises an assembly consisting of a carrier body comprising a high-temperature alloy, a functional element and an at least partially crystallized glass, and the at least partially crystallized glass is arranged between a portion of the functional element and a portion of the carrier body, and the carrier body has associated therewith a fastening means for a further functional unit.

If a further functional unit is arranged on the carrier body, and the further functional unit has a fastening means which is associated with the fastening means provided on the carrier body, it is possible to achieve many advantageous effects and to implement many advantageous applications in this manner. This functional unit can, for example, provide a pressure-shielding effect for the at least partially crystallized glass, as well as retaining forces for the functional element.

For this purpose, in the case of the lead-through or connecting element, the fastening means of the further functional unit arranged on the carrier body may be connected with the fastening means of the carrier body by a material bond and/or in form-fitting manner.

Furthermore, the fastening means of the further functional unit arranged on the carrier body may advantageously be connected to the fastening means by welding, soldering with a metallic solder, brazing with a metallic solder, by a glass solder, screws, latching means, rivets, by crimping, thermal shrinking, chemical bonding, or by an intermediate sealant, in particular a metallic sealant.

In a particularly preferred embodiment, the further functional unit arranged on the carrier body comprises a mineral-insulated (MI) cable.

In a particularly preferred lead-through or connecting element, the carrier body comprising the high-temperature alloy and subjecting the crystallized glass to the compressive stress hermetically seals the interface between the carrier body and the crystallized glass, and the fastening means hermetically seals the connection to the functional unit.

If in the lead-through or connecting element, the functional element comprises at least one releasably connectable, in particular plug-in type connectable element which has associated therewith a further element of a further unit which can be connected thereto, it is possible to provide flexible through connections in the form of pluggable connectors associated with each other. Such an embodiment can be particularly advantageous when the lead-through or connecting element is used in oil and/or natural gas drilling or exploration equipment, or in a power generation or energy storage system comprising a housing, or in an encapsulation of a power generation system or an energy storage system or of a reactor or of a storage device for toxic and/or harmful matter, in particular as a lead-through means within a containment of a reactor, or as a lead-through means through the containment of a reactor, in particular a nuclear reactor, or in a spacecraft or in a space exploration vehicle, or in a housing of a sensor and/or an actuator, since in this case high safety can be provided due to the large range of operating temperatures even in thermally difficult ambient conditions, for example in safety-critical or incident situations. These may, for example, include sensors or actuators which remain functional in the event of fires and thus allow appropriate emergency measures such as defined shutdowns, initiation of extinguishing operations, maintenance and/or initiation of cooling or else evacuation procedures.

For this purpose, it is particularly advantageous if the at least one releasably connectable, in particular plug-in type connectable element of the lead-through or connecting element and the element associated with the plug-in type connectable element are adapted to provide a connection for electrical current, a form-fitting waveguide arrangement as a male-female assembly, a connection for optical waveguides or a fluid passage, depending on the application. The releasable plug-in type connection may furthermore be equipped with an anti-withdrawal safety means which prevents accidental disconnection of the connection and/or disconnection in emergency situations.

In a preferred embodiment, a functional unit equipped with at least one fastening portion, which fastening portion of the functional unit is associated with the fastening portion of the lead-through or connecting element, comprises an element from the group consisting of sheath, conductor sheath, sensor housing, and actuator housing. This provides for a very flexible application range of the devices according to the invention and allows to implement a variety of technically advantageous applications and uses.

In this functional unit, the actuator housing may have associated therewith a linear and/or rotary drive for solid-state and/or fluid media, for example. This makes it possible to drive, by means of actuators, linear and rotary drives and drives for fluid media such as pumps, impeller wheels, open screws, such as, for example, in water turbines, Pelton turbines, or in hot-steam gas turbines, and to capture the behavior thereof by means of sensors.

For sensory detection, the sensor housing may advantageously have associated therewith an optical, electrical, in particular inductive, capacitive, and/or piezoelectric sensor.

If the conductor sheath of the functional unit surrounds an electrical, an electromagnetic, in particular a high-frequency connection comprising a waveguide and/or an optical connection or defines a portion of this connection, the connections and feedthroughs which are made possible thereby allow for process-related important control and closed-loop control processes in the area of electrical and electronic control devices and optoelectronic devices, in particular even under harsh operating conditions.

A particularly preferred embodiment results when the sheath or conductor sheath surrounds an electrical, an electromagnetic, in particular a high-frequency connection comprising a waveguide or defines a portion of this connection, wherein a mineral insulating material, in particular magnesium oxide may be disposed between the conductor sheath made of steel and the electrical, electromagnetic, or waveguide conductor.

Preferably, the conductor may comprise a thermal or heating element.

In a further embodiment, the functional unit may advantageously comprise a mechanical, electrical, and/or electrochemical energy storage.

In particular in energy generating systems such as, for example, industrial power generation systems or in internal combustion engines, the functional unit may as well comprise hydrogen passages.

With the high operating temperatures which are made possible by the invention in safe manner, such lead-through or connecting elements, such functional units, and also combinations thereof, can be employed very advantageously in oil and/or natural gas drilling or exploration equipment, or in a power generation or energy storage system comprising a housing, or in an encapsulation of a power generation system or of an energy storage system or of a reactor or of a storage device for toxic and/or harmful matter, or in a spacecraft or space exploration vehicle, or in a housing of a sensor and/or an actuator.

Advantageously, a method for producing a lead-through or connecting element may comprise the process steps listed below: providing an at least partially crystallizable starting material, in particular an at least partially crystallizable or partially crystallized glass; providing a carrier body which defines an interior volume providing space for accommodating further components of the lead-through or connecting element; arranging the at least partially crystallizable starting material within at least one portion of the carrier body, the at least one portion of the carrier body being located within the interior volume of the carrier body; preferably providing a functional element; preferably arranging the functional element so that at least a portion of the functional element is surrounded by the at least partially crystallizable starting material, wherein the arrangement of the at least partially crystallizable starting material and the functional element is arranged within the interior volume of the carrier body, at least a portion thereof; wherein the arrangement of the at least partially crystallizable starting material is arranged within the interior volume of the carrier body, at least a portion thereof; heating the arrangement of carrier body, at least partially crystallizable starting material and preferably functional element, wherein the heating is performed until a temperature is reached at which the at least partially crystallizable starting material bears against at least a portion of the carrier body in form-fitting manner and fuses to the carrier body, and at which the at least partially crystallizable starting material bears against at least a portion of the functional element, preferably in form-fitting manner, and preferably fuses to the functional element; preferably adjusting a temperature of the arrangement of carrier body, at least partially crystallizable starting material and preferably functional element, at which the at least partially crystallizable starting material at least partially crystallizes; cooling the arrangement of carrier body, at least partially crystallizable starting material, and functional element.

The crystallization of the at least partially crystallizable starting material is in particular determined by controlling the temperature profile. Particularly preferably, the material is a self-crystallizing material. That means, it is not necessary to add further substances such as, e.g., fillers as crystallization nuclei, for initiating the crystallization.

In such a method, very advantageously for the arrangement of carrier body, at least partially crystallizable starting material and functional element, an at least partial crystallization can be accomplished at a temperature different from that at which the crystallizable glass preferably fuses to both the functional element and the carrier body, but at least to the carrier body. With this at least partial crystallization it is possible in many cases to substantially improve the mechanical strength of the at least partially crystallized glass. By choosing the crystallization temperature $T_K$ independently from of the aforementioned glass sealing temperature, which is sometimes referred to as spherical temperature in literature, it is possible to accomplish crystallization or at least partial crystallization at higher temperatures and more rapidly, for example, which moreover usually results in higher inversion temperatures.

It is also possible to accomplish the at least partial crystallization at lower temperatures than the glass sealing temperature, for example if lower inversion temperatures are to be achieved.

Furthermore, it is also possible that the starting material used according to the invention already exhibits at least partial crystallization, as long as the remaining glassy portion is sufficient so that when heated according to the inventive method the at least partially crystallizable and partially crystallized starting material engages at least a portion of the carrier body in form-fitting manner and fuses to the carrier body, and so that the at least partially crystallizable and partially crystallized starting material engages at least a portion of the functional element, preferably in form-fitting manner, and preferably fuses to the functional element.

With suitable material combinations for the at least partially crystallized glass, preferably the functional element, and the carrier body, the operating temperature may even extend beyond the inversion temperature, for example, if due to the adherence of the at least partially crystallized glass preferably on the functional element and on the carrier body, but at least on the carrier body, tensile stresses between these elements are possible without causing detachment of the at least partially crystallized glass from the functional element, if provided, and from the carrier body. Such operating temperatures may even be above the inversion temperature measured in Kelvin by up to 20%. Except for this temperature specification in Kelvin, all other temperature specifications in the present application are given in degrees Celsius unless otherwise noted.

Furthermore, with increasing crystallization, the coefficient of thermal expansion of the at least partially crystallized glass, $CTE_G$, will advantageously remain constant over a large temperature range, even beyond the crystallization temperature $T_K$.

According to one method for producing a lead-through or connecting element, the temperature $T_K$ is advantageously more than 450° C., preferably more than 550° C., more preferably more than 650° C., and yet more preferably more than 750° C., and more preferably more than 900° C., more preferably more than 950° C., and most preferably more than 1000° C. Advantageous upper limits for the maximum operating temperature which can be achieved with the invention as a result thereof are approximately 950° C., but even 1000° C., 1100° C., and/or 1200° C., depending on the choice of the at least partially crystallizable glass and preferably also of the high-temperature alloy.

The extremely favorable thermal resistance described above can be achieved by a method for producing a lead-through or connecting element, in which the at least partially crystallized glass is a glass or a glass ceramic or a glass-based crystallized material with a volume resistivity of more than $1.0 \times 10^{10}$ Ωcm at a temperature of 350° C., and in which the glass or the glass ceramic or the glass-based crystallized material contains the following components on an oxide basis, in mol %:

$SiO_2$ 25-55
$B_2O_3$ 0.1-15
$Al_2O_3$ 0-15
MO 20-50
$M_2O$ 0-<2,
wherein MO is selected from the group consisting of MgO, CaO, SrO, BaO, individually or in any combination thereof, and wherein $M_2O$ is selected from the group consisting of $Li_2O$, $Na_2O$, $K_2O$, individually or in any combination thereof.

If, in such a method for producing a lead-through or connecting element, the carrier body comprises a metallic high-temperature alloy with a thermal expansion coefficient $CTE_H$ which in a range from 10° C. to at least the temperature $T_K$ is greater than the thermal expansion coefficient of the at least partially crystallized glass, $CTE_G$, it is possible to reliably maintain, in this temperature range, compressive stresses which are greater or at least equal to zero.

Depending on the choice of the at least partially crystallized starting glass, during the cooling of the arrangement of carrier body, glassy, at least partially crystallizable or at least partially crystallized starting material and preferably also functional element, the carrier body can exert a compressive stress of greater than or equal to zero on the at least partially crystallized glass 3, at a temperature from at least 20° C. to more than 450° C., preferably at a temperature from at least 20° C. to more than 550° C., more preferably at a temperature from at least 20° C. to more than 650° C., and yet more preferably at a temperature from at least 10° C. up to more than 750° C., and most preferably at a temperature from at least 10° C. up to more than 900° C., in case of the preferred at least partially crystallized glasses in a range of more than 450° C., in particular up to 950° C., and preferably up to 1000° C. or more, preferably up to 1100° C., more preferably up to 1200° C.

The inventors have found that the lead-through or connecting element according to the invention allows the operating temperatures and/or temperatures upon an incident to be greater, even permanently, than the transition temperature $T_g$ of the remaining amorphous regions of the residual glass phase which is still existing besides the crystallized regions in the partially crystallized glass materials that are most preferably used. If $T_g$ is exceeded, the amorphous material usually softens, so to say. In the present case, however, the crystallized regions and/or crystal phases are able to support the quasi soft material so that the latter is not pressed out of the carrier body, neither by the compressive stress it is subjected to by the carrier body, nor by the expected operating and/or incident conditions.

In a particularly advantageous embodiment it is even possible at operating and/or incident temperatures above $T_g$, that the partially crystallized glass material further crystallizes, so that the proportion of crystalline phases in the overall volume of the at least partially crystallized glass material increases, whereby the lead-through or connecting element of the invention is strengthened, in particular becomes even more robust during operation and/or even in the event of an incident.

BRIEF DESCRIPTION OF DRAWINGS

The invention will be described in more detail below by way of preferred embodiments and with reference to the accompanying drawings, wherein:

FIG. 8 is a highly simplified schematic cross-sectional view of a fourth embodiment of a lead-through or connecting element which is retained in a containment preferably in hermetically sealed manner, with a female plug-in connector in which a mineral-insulated cable is connected to the lead-through or connecting element;

FIG. 9 is a highly simplified schematic cross-sectional view of a fifth embodiment of a lead-through or connecting element, in which the functional element of the lead-through or connecting element includes a passage for a fluid connection;

FIG. 11 is a greatly simplified schematic cross-sectional view of a power generation system comprising a housing and an encapsulation, both of the latter comprising a lead-through or connecting element according to any of the preferred embodiments of the invention.

DETAILED DESCRIPTION

Figure 1:
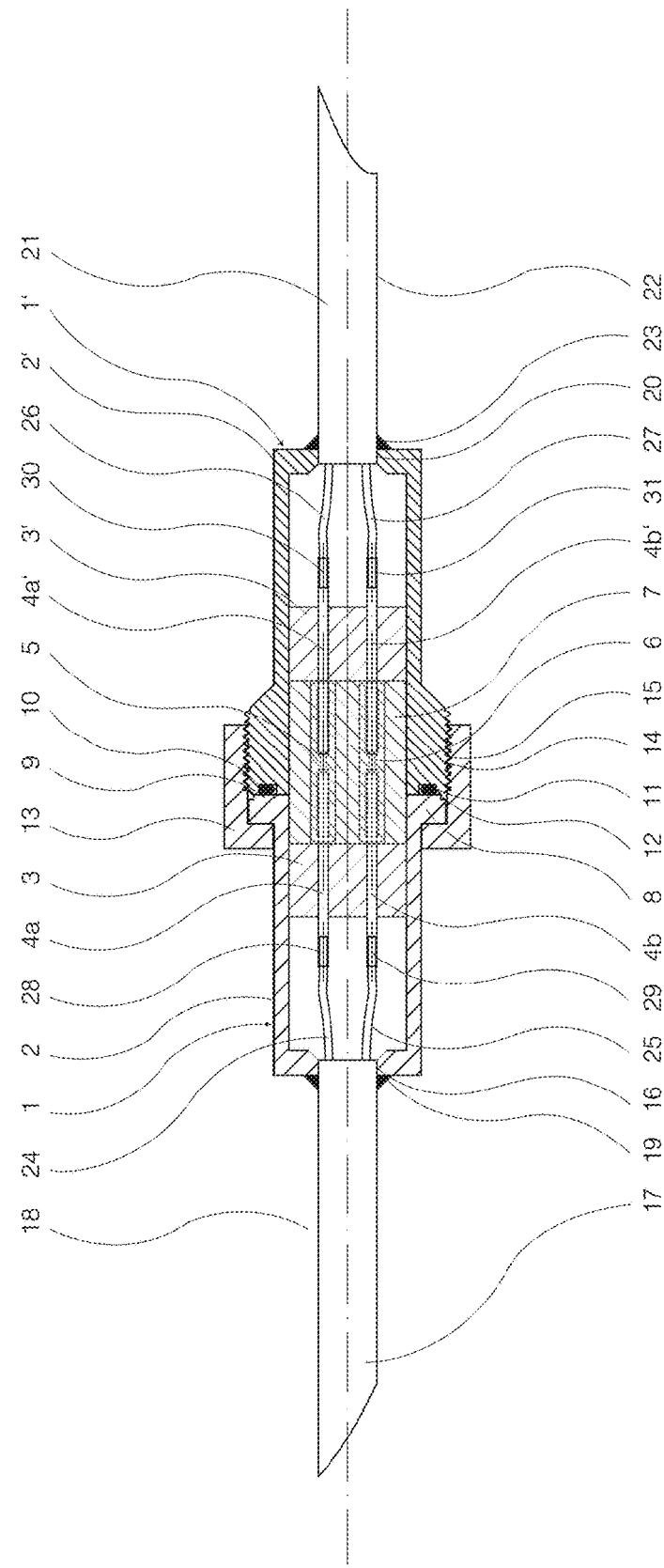
FIG. 1 is a schematic cross-sectional view of a first embodiment of a lead-through or connecting element, in which two cables provided with a metallic cable sheath and insulated with mineral material (MI cables) are interconnected by means of a lead-through or connecting element.

In the present application, the term 'at least partially crystallizable or at least partially crystallized glass' is intended to refer to a glass which can be converted, by a thermal load, from a glassy phase into a state which includes, in addition to the glassy phase or almost completely, a crystallized phase. In particular, this term is intended to encompass also glass ceramics which are not yet crystallized, are only partially crystallized, or are completely crystallized.

In the following description, the same reference numerals in the various embodiments designate the same functional elements or components. Unless otherwise stated, all statements in particular also regarding the employed materials equally apply to components denoted by the same reference numerals for all described embodiments.

For the sake of clarity and for a better understanding, all of the figures are not drawn to scale.

Referring now to FIG. 1, which shows a cross-sectional view of a first embodiment of a lead-through or connecting element which in this embodiment comprises two connecting elements that are denoted, as a whole, by reference numerals 1 and 1', respectively.

The essentially cylindrical carrier body 2 and 2' of the respective connecting element 1, 1' surrounds an at least partially crystallizable or at least partially crystallized glass 3 and 3' which is fused thereto and which in turn retains a respective pair of functional elements 4a, 4b, and 4a', 4b', respectively. In this embodiment, functional elements 4a, 4b and 4a', 4b' define plug-in connectors each of which is engaged with respective metallic contact sockets 5 and 6.

In further embodiments not illustrated in the figures, functional elements 4, 4a, 4b, and 4a', 4b', 34 may as well be functionally defined or replaced by the at least partially crystallizable glass 3, 3' and are not provided as an additional physical element but by the at least partially crystallizable glass 3, 3' itself.

From the accompanying figures and from the further disclosure of the present invention it will be apparent for a person skilled in the art how to implement such a modified functional element, for example with sensors and/or actuators arranged on both sides of the crystallizable glass in an axial direction.

In the present embodiment, without however limiting generality, carrier bodies 2, 2' each are made of a heat-resistant metallic alloy or metallic high-temperature alloy, for example Inconel 750.

However, depending on the specific application and use case, other embodiments may do without high-temperature alloys as regards the material of the carrier body, as long as the thermal application range of the respective material satisfies the prevailing operating conditions.

Without limiting generality, functional elements 4a, 4b and 4a', 4b' essentially consist of a NiFe alloy, or CF25, an FeCo alloy, each one embedded in or fused into the at least partially crystallized glass 3, 3', as will be described in more detail below. In this way, the at least partially crystallized glass 3, 3' is disposed between a portion of the functional element 4a, 4b and 4a', 4b' and a portion of carrier body 2, 2' in each case.

Contact sockets 5, 6 may essentially consist of the same material as functional elements 4a, 4b and 4a', 4b', i.e. may also essentially consist of a NiFe alloy, or of CF25, an FeCo alloy, and are retained in an insulating, essentially cylindrical holder 7 which is arranged in a cavity defined between the two connecting elements 1, 1'. The essentially cylindrical holder 7 comprises or is made of a temperature-resistant ceramic or of the at least partially crystallized glass 3.

The carrier body 2 has, on its end facing the carrier body 2', a radial extension in the form of an annular shoulder 8, with a high-temperature metallic gasket 10 bearing against the end-side flange surface 9 thereof, which gasket may be implemented as a gas-filled annular tubular gasket or as a single-crystal metal gasket, for example.

The high-temperature metallic gasket 10 is retained in an annular groove 11 which is formed in the radially extended end face 12 of carrier body 2'.

Coupling nut 13 bears against an annular shoulder of carrier body 2 and has an internal thread 14 interengaged with the external thread 15 of the radial extension of carrier body 2'. By means of threads 14 and 15, the two carrier bodies 2 and 2' are held against each other in a mechanically firm manner, and the high-temperature gasket 10 is subjected to a force which ensures that a hermetic seal is established between carrier bodies 2 and 2', which is resistant under continuous operation.

In this way, a releasably connectable connection is provided, in particular with a functional element embodied as a plug-in connectable element.

On the left or base-side end of carrier body 2 in FIG. 1, an opening 16 is defined, and protruding into it is the cable sheath 17 preferably made of steel or a steel alloy of a high-temperature resistant mineral-insulated cable (MI cable) 18 which is preferably insulated with magnesium oxide. Mineral-insulated cable 18 is mechanically fixed to the carrier body 2 by a welded or brazed joint 19, so as to be hermetically sealed under continuous operation.

On the right or base-side end of carrier body 2' in FIG. 1, an opening 20 is defined, and protruding into it is the cable sheath 21 preferably made of steel or a steel alloy of a high-temperature resistant mineral-insulated cable (MI cable) 22 which is preferably insulated with magnesium oxide. Mineral-insulated cable 22 is mechanically fixed to the carrier body 2' by a welded or brazed joint 23, so as to be hermetically sealed under continuous operation.

With this configuration described above it can be ensured that virtually no forces are exerted on the functional elements 4a, 4b, 4a', 4b' and on the at least partially crystallized glass 3, 3' from outside the carrier bodies 2, 2', and that pressure differences between the exterior and the interior of the carrier bodies 2, 2' also have essentially no impact on the functional elements 4a, 4b, 4a', 4b' and on the at least partially crystallized glass 3, 3'.

As a result, each respective assembly consisting of carrier body 2, 2', functional elements 4a, 4b, 4a', 4b', and the at least partially crystallized glass 3, 3' substantially does not have to resist virtually any mechanical and pressure loads within its range of operating temperatures, that means except for variations of the internal pressure within the carrier bodies 2, 2' caused by temperature differences and shear or tensile forces caused by differential thermal expansions, because, by virtue of the arrangement described above, the functional elements 4a, 4b, 4a', 4b' arranged within the respective carrier body 2, 2' and the at least partially crystallized glass 3, 3' are hermetically sealed from the exterior of carrier bodies 2, 2' and shielded against mechanical impacts.

The copper conductors 24 and 25 of the mineral-insulated cable 18 and the copper conductors 26 and 27 of the mineral-insulated cable 22, which are each connected to the functional elements 4a, 4b and 4a', 4b by a crimped joint 28, 29, and 30, 31, or by a brazed joint, also subject the functional elements 4a, 4b and 4a', 4b' to only very small tensile or shear forces over the entire operating temperature range, due to their thermal expansion behavior, which does not lead to a noticeable mechanical load and thus does not cause any breaking of the respective bond to the at least partially crystallized glass 3, 3' which could otherwise impair hermeticity.

Such an arrangement is capable of providing significantly higher operating temperatures, since the holding forces that need to be provided by the at least partially crystallized glass are substantially lower and in particular do not have to withstand external pulling forces or external pressure shocks in the high-temperature range.

In a preferred embodiment of the lead-through or connecting element not illustrated in the figures, which comprises an assembly of a carrier body and an at least partially crystallized glass, the at least partially crystallized glass is arranged in a portion of the carrier body, and the at least partially crystallizable glass alone is already capable of providing transport of acoustic and/or electromagnetic signals therethrough, in a manner sufficient for signal transmission.

Most surprisingly, considerable improvements have been obtained compared to conventional lead-through or connecting element with compression glass seals. In particular, surprisingly, it was possible to achieve operating temperatures of up to above the inversion temperature of the at least partially crystallizable or partially crystallized glass 3, 3'. With the preferred embodiments described above and further below in more detail, operating temperatures of up to more than 1000° C. were surprisingly achieved. Advantageous upper limits which can be achieved with the invention are about 950° C., but in particular even 1000° C., 1100° C., and/or 1200° C.

Figure 3:
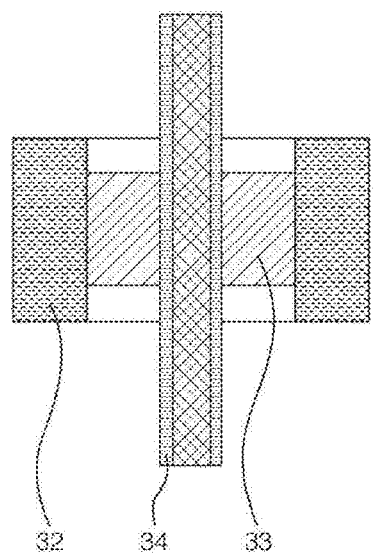
FIG. 3 is a schematic cross-sectional view of a conventional compression glass sealed passage with a carrier body in which a glass is held surrounding a lead-through element.

In conventional compression glass seals such as illustrated in FIG. 3, by way of example, a glass 33 is accommodated in the interior of and fused to a metallic carrier body 32 that is preferably made of steel, and the glass retains a functional element 34, which is accommodated therein and also fused thereto, in this case a cylindrical tube as a fluid passage in particular for helium, hydrogen, hot gases, or liquids, for example cooling media, as it can also be used as a functional element in the embodiments of the invention.

Figure 4:
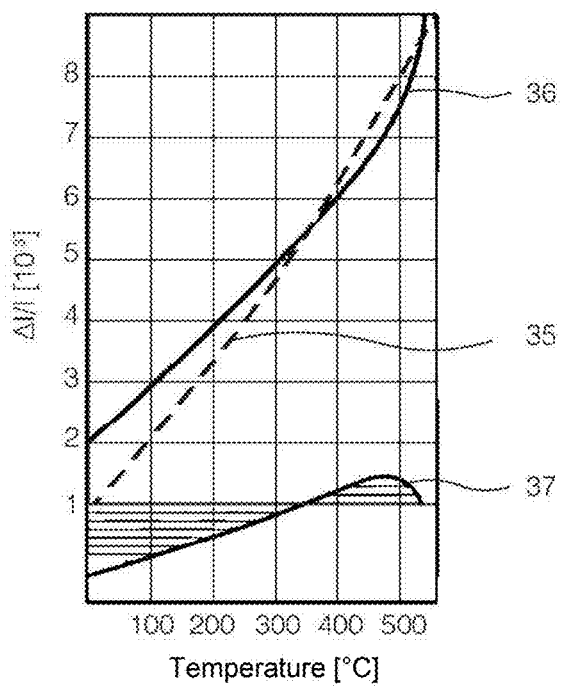
FIG. 4 is a diagram showing the relative thermal expansion of a glass and of steel as a function of temperature, and a profile of the compressive stresses resulting from these relative thermal expansions, as a function of temperature.

FIG. 4 shows a diagram with curve 35 representing the relative thermal expansion of the glass 33, and curve 36 representing the relative thermal expansion of the steel of carrier body 32 as a function of temperature for conventional compression glass seals available on the market. It can be seen that these curves intersect at about 350° C. which approximately corresponds to the glass sealing temperature. This temperature corresponds to the inversion temperature known from the prior art.

In the lower part of the diagram of FIG. 4, the compressive and tensile stresses resulting from these relative thermal expansions are shown by curve 37, also as a function of temperature.

It can be clearly seen that above the temperature at which curves 35 and 36 intersect, i.e. above the inversion temperature, the stress changes from compressive stresses to tensile stresses, which exert forces on the assembly consisting of carrier body 32, glass 33, and functional element 34, which may result in breakage thereof and impairment of the hermeticity thereof, and therefore, in any case, define an upper limit for a reliable operating temperature resistant under continuous operation for this lead-through element at values clearly below 350° C.

If now, as was found by the inventors, high-temperature alloys are used for the carrier body 2 instead of the steel, or at least high-temperature resistant metallic materials, at least partially crystallizable glasses can be fused to the carrier body in the interior thereof and to the functional element 4 at substantially higher temperatures, and additionally they may even be caused to crystallize in this state.

Figure 2:
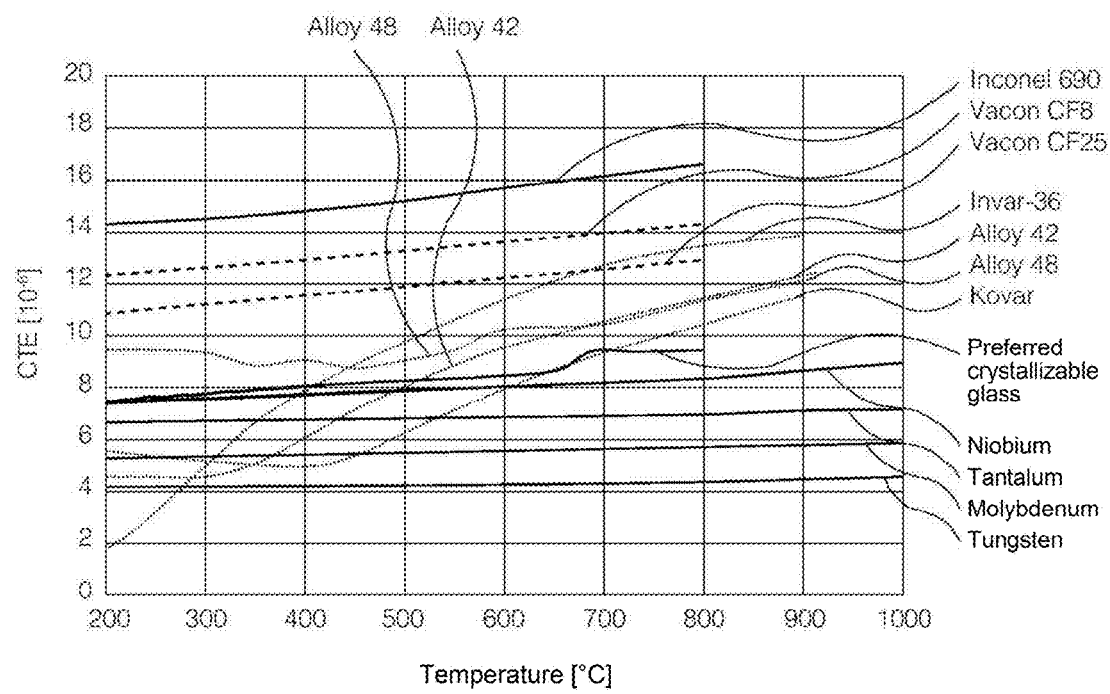
FIG. 2 is a diagram of the coefficient of thermal expansion, CTE, as a function of temperature for various metals, metal alloys, in particular metallic high-temperature alloys, and for a crystallizable or crystallized glass according to the invention.

For the following discussion of materials that are suitable for the carrier body 2, 2', reference is made to FIG. 2 which shows a diagram of the coefficient of thermal expansion, CTE, as a function of temperature for various metals, metal alloys, in particular metallic high-temperature alloys, and for a crystallizable or crystallized glass according to the table for the material 1 which will be referred to as the preferred at least partially crystallizable glass, as in FIG. 2, or else as Material 1.

For a better understanding of the interaction between the carrier body and the at least partially crystallizable or at least partially crystallized glass, first the materials shall be mentioned which are preferred for this purpose.

Preferably, the at least partially crystallized glass 3, 3' is a glass or a glass ceramic or a glass-based crystallized material with a volume resistivity of more than $1.0 \times 10^{10}$ Ωcm at a temperature of 350° C., and the glass or the glass ceramic or the glass-based crystallized material contains the following components on an oxide basis, in mol %:

$SiO_2$ 25-55
$B_2O_3$ 0.1-15
$Al_2O_3$ 0-15
MO 20-50
$M_2O$ 0-<2, wherein MO is selected from the group consisting of MgO, CaO, SrO, BaO, individually or in any combination thereof, and wherein $M_2O$ is selected from the group consisting of $Li_2O$, $Na_2O$, $K_2O$, individually or in any combination thereof.

Most preferably, the at least partially crystallized glass has the following composition, with a volume resistivity that is also given below:

| Composition [mol %] | |
|---|---|
| $SiO_2$ | 38.7 |
| $B_2O_3$ | 8.9 |
| $Al_2O_3$ | 1.6 |
| BaO | 0.0 |
| CaO | 36.7 |
| MgO | 6.7 |
| $Y_2O_3$ | 3.4 |
| $ZrO_2$ | 4.0 |
| Volume resistivity at 350° C. [Ω cm] | $3.9 \times 10^{11}$ |

All values of the above composition of this Material 1 are given in mole percent on an oxide basis.

The coefficient of thermal expansion $CTE_G$ of this at least partially crystallizable glass or at least partially crystallized glass is also indicated in the diagram of FIG. 2 as a value of a glass covered by the invention.

From the diagram of FIG. 2 it can be seen that only a few of the high-temperature resistant materials have a coefficient of thermal expansion $CTE_H$ which is greater than the coefficient of thermal expansion $CTE_G$ of the at least partially crystallizable glass or at least partially crystallized glass and which is consequently suitable for subjecting the at least partially crystallizable glass or at least partially crystallized glass to a compressive stress over the entire range of operating temperatures.

First, all materials are suitable which have a CTE that is greater than the coefficient of thermal expansion of the at least partially crystallized or crystallizable glass $CTE_G$ over the entire range of operating temperatures of the lead-through or connecting element 1, 1', and these will also be referred to as high-temperature alloys below. High-temperature alloys in the sense of the invention in particular refer to metallic materials which are still sufficiently tough at the operating temperatures envisaged according to the invention of more than 450° C., in particular above 700° C. or above 900° C., in order to be able to exert a compressive stress on the at least partially crystallized glass.

More generally, and with regard to various suitable crystallizable glasses and materials for the carrier body, the following statements can be made.

The coefficient of thermal expansion $CTE_G$ of the at least partially crystallized glass should be smaller than the coefficient of thermal expansion $CTE_H$ of the high-temperature alloy by a factor $F_{CTE}$ which is greater than 1.06, except for a deviation of about 5%, and this at a temperature from at least 20° C. to more than 450° C., preferably at a temperature from at least 20° C. to more than 550° C., more preferably at a temperature from at least 20° C. to more than 650° C., at a temperature from at least 10° C. to more than 750° C., and more preferably at a temperature of more than 900° C., advantageously at a temperature of more than 950° C.

Generally, the factor $F_{CTE}$ should be in a range from 1.06 to 3.5.

A particularly preferred material for the carrier body 2, 2' is Inconel 690 which has a thermal expansion coefficient $CTE_H$ that has the highest values in the diagram of FIG. 2 over the entire temperature range and surprisingly allows for such a good wetting by the glass according to the table for Material 1 that at a temperature of about 870° C. the latter can conform to a carrier body 2, 2' made of Inconel 690 and can fuse hermetically thereto, this process also being referred to as glass sealing, and this temperature being referred to as glass sealing temperature.

The inventors have found that excellent properties can be obtained for the embodiments of the lead-through and connecting element described herein, if the crystallization of the at least partially crystallizable glass is not accomplished at the glass sealing temperature thereof, i.e. the temperature at which the at least partially crystallizable starting material engages at least a portion of the carrier body in form-fitting manner and fuses to the carrier body and at which the at least partially crystallizable starting material engages at least a portion of the functional element in form-fitting manner and preferably fuses to the functional element. Advantageously, the crystallization temperature $T_K$ can be greater than the glass sealing temperature, for example at 954° C. The crystallization temperature $T_K$ can even be more than 1000° C., in spite of a glass sealing temperature of for instance 870° C.; for example the crystallization temperature $T_K$ may in particular be up to 950° C. and preferably up to 1000° C. or more, more preferably up to 1100° C., most preferably up to 1200° C.

With a suitable choice of the starting material of the at least partially crystallizable glass, the thermal expansion coefficient $CTE_G$ of the at least partially crystallized glass can still be constant even at a temperature within a temperature interval of several degrees Celsius above the inversion temperature.

Exemplary crystallization durations may be in a range of more than one hour, e.g. two hours.

If, now, the value of thermal expansion coefficient $CTE_G$ of the at least partially crystallizable or at least partially crystallized glass, Material 1, according to the table is plotted as a function of temperature and the value of thermal expansion coefficient $CTE_H$ of the metallic high-temperature alloy Inconel 690 is plotted as a function of temperature with a vertical shift so that the curves intersect at the crystallization temperature of the glass of Material 1 of about 950° C., a similar conclusion about the compressive and tensile stresses is obtained as discussed in conjunction with FIG. 4.

Figure 5:
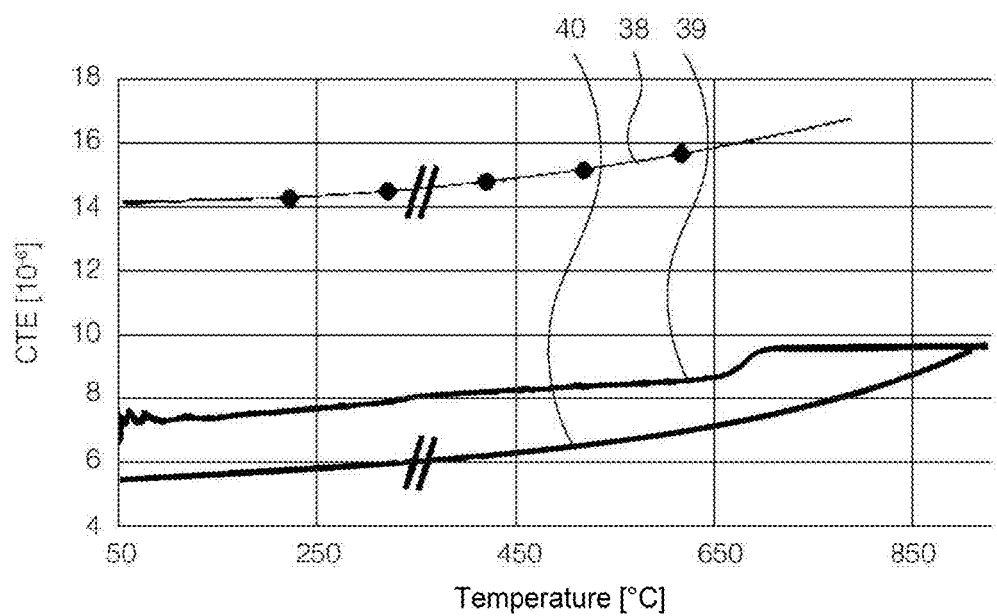
FIG. 5 is a diagram showing the thermal expansion coefficient $CTE_G$ of the at least partially crystallizable or at least partially crystallized glass which is preferred according to the invention, and the thermal expansion coefficient $CTE_H$ of metallic high-temperature alloy Inconel 690 with its actual values and with values shifted by an amount $CTE_K$, as a function of temperature in each case.

FIG. 5 shows such a diagram which shows, as a function of temperature in each case, the actual curve 38 of the coefficient of thermal expansion $CTE_H$ of the metallic high-temperature alloy Inconel 690, the curve 39 of the coefficient of thermal expansion $CTE_G$ of the at least partially crystallizable or at least partially crystallized glass according to the table for Material 1, and the curve 40 of the coefficient of thermal expansion $CTE_H$ of the metallic high-temperature alloy Inconel 690 with the values thereof shifted by an amount $CTE_K$ to lower values, wherein the amount $CTE_K$ indicates the coefficient of thermal expansion $CTE_H$ of the high-temperature alloy Inconel 690 at the crystallization temperature of the crystallized glass according to the table for Material 1 of about 950° C.

It can be seen that over the entire range of operating temperatures from about 50° C. to more than 850° C. which is shown in FIG. 5, the high-temperature alloy comprising Inconel 690 is reliably capable of subjecting the crystallized glass to compressive stresses.

It has in particular been found for the embodiments described herein, that if appropriate measures are taken for shielding against an impact of external mechanical forces and external pressures, such as those described above, it is possible to achieve even higher operating temperatures, namely temperatures that are higher by up to more than 20% than the inversion temperature.

Since, after crystallization, the at least partially crystallized glass has a further temperature range above $CTE_K$, in which its thermal expansion coefficient is essentially constant, it is possible to achieve operating temperatures of more than 900° C., even up to about 1000° C., and, depending on the choice of the at least partially crystallizable glass and of the high-temperature alloy of the carrier body, of even at more than 1000° C. The maximum operating temperature may be in a range of more than 450° C., in particular up to 950° C., and preferably up to 1000° C. or more, more preferably up to 1100° C., most preferably up to 1200° C. In the preferred case, the operating temperature extends up to the softening temperature or even the melting temperature of the crystallized glass. It has to be noted that this is a characteristic of the overall system. As stated before, an existing amorphous residual glass phase can certainly have a lower softening temperature.

A method suitable for manufacturing the lead-through and connecting elements of the embodiments described herein is the method as described below, for example.

In this method for producing a lead-through or connecting element, the following method steps are performed. An at least partially crystallizable starting material is provided, in particular an crystallizable glass. A carrier body is provided which defines an interior volume in which space is provided for accommodating further components of the lead-through or connecting element. Here, this interior volume is at least part of the cylindrical carrier body 2, 2' or part of the interior of the carrier bodies of the embodiments described below. The at least partially crystallizable starting material is arranged within at least one portion of the carrier body, and this at least one portion of the carrier body is located within the interior volume of the carrier body. Here, the at least partially crystallizable glass can be provided in the form of a body which can be introduced into the carrier body 2, 2' and into the carrier bodies of the embodiments described below in an almost form-fitting manner and moreover surrounds the functional element 4 or the functional elements 4a, 4b, 4a', 4b' in an almost form-fitting manner. Preferably, a functional element is provided. Preferably, the functional element is arranged so that at least a portion of the functional element is surrounded by the at least partially crystallizable starting material, and the arrangement of the at least partially crystallizable starting material and preferably of the functional element is arranged within the interior volume of the carrier body, at least a portion thereof. The arrangement of carrier body, at least partially crystallizable starting material and preferably functional element is heated, wherein the heating is performed until a temperature is reached at which the at least partially crystallizable starting material bears against at least a portion of the carrier body in a form-fitting manner and fuses to the carrier body, and at which the at least partially crystallizable starting material preferably bears against at least a portion of the functional element in a form-fitting manner and preferably fuses to the functional element. Preferably, a temperature of the arrangement of carrier body, at least partially crystallizable starting material and functional element is adjusted, at which the at least partially crystallizable starting material at least partially crystallizes. The arrangement of carrier body, at least partially crystallizable starting material, and functional element is cooled.

The heating is performed up to the temperature at which the glassy, at least partially crystallizable or at least partially crystallized starting material engages a portion of the carrier body in a form-fitting manner and fuses to the carrier body, and at which the glassy, at least partially crystallizable or at least partially crystallized starting material preferably also engages at least one portion of the functional element in a form-fitting manner and preferably fuses to the functional element.

Advantageously, this temperature need not necessarily define the temperature $T_K$ at which the glassy starting material at least partially crystallizes and becomes a partially crystallized glass and at which the carrier body exerts a compressive stress of substantially zero on the at least partially crystallized glass.

If the temperature $T_K$ differs from the temperature at which the at least partially crystallizable starting material fuses to the carrier body and at which the at least partially crystallizable starting material fuses to the functional element, there are further degrees of freedom in process control resulting, which in particular even allow for crystallization temperatures and inversion temperatures that are substantially higher than the aforementioned glass sealing temperature. As a result, considerably higher operating temperatures can be achieved compared to conventional compression glass seals.

Advantageously, in spite of a glass sealing temperature of 870° C., the crystallization temperature $T_K$ may be 954° C., for example. In spite of this glass sealing temperature of 870° C., for example, the crystallization temperature $T_K$ may even be above 1000° C., for example the crystallization temperature $T_K$ may in particular be up to 950° C. and preferably up to 1000° C. or more, more preferably up to 1100° C., most preferably up to 1200° C.

These advantageous upper limits which can be obtained with the invention can be achieved with the method described herein by an appropriate choice essentially of the at least partially crystallizable glass and of the high-temperature alloy for the carrier body 2.

For several glasses which are at least partially crystallizable, the temperature $T_K$ may be more than 450° C., preferably more than 550° C., more preferably more than 650° C., and yet more preferably more than 750° C., and most preferably more than 900° C., and the appropriate degree of crystallization is adjusted through respective holding times at these temperatures.

As described above, the preferred at least partially crystallized glass 3 used in the present method comprises a glass or a glass ceramic or a glass-based crystallized material with a volume resistivity of more than $1.0 \times 10^{10}$ Ωcm at a temperature of 350° C., and the glass or the glass ceramic or the glass-based crystallized material contains the following components on an oxide basis, in mol %:

$SiO_2$ 25-55
$B_2O_3$ 0.1-15
$Al_2O_3$ 0-15
MO 20-50
$M_2O$ 0-<2,
  wherein MO is selected from the group consisting of MgO, CaO, SrO, BaO, individually or in any combination thereof, and wherein $M_2O$ is selected from the group consisting of $Li_2O$, $Na_2O$, $K_2O$, individually or in any combination thereof,
  and the carrier body comprises a metallic high-temperature alloy having a coefficient of thermal expansion $CTE_H$ which, in a range from 10° C. to at least the temperature $T_K$, is greater than the coefficient of thermal expansion of the at least partially crystallized glass $CTE_G$.

In the aforementioned at least partially crystallizable glass and in Material 1, the main phase thereof comprises wollastonite, zirconium dioxide, and diopside. The coefficient of thermal expansion CTE of wollastonite is similar to the glass phase, that of $ZrO_2$ is higher.

Advantageously, with this method, if a temperature of 950° C. is chosen for adjusting the temperature of the arrangement of carrier body 2, at least partially crystallizable glass 3, and functional element 4, at which the at least partially crystallizable glass at least partially crystallizes, and this temperature is maintained over a period of two hours before cooling is initiated, it is possible to obtain a proportion of crystals of greater than 75%, in percent by weight, relative to the remaining glassy phase.

A glass crystallized or at least partially crystallized in this manner, in particular as mentioned for the preferred at least partially crystallizable glasses or that with the composition of Material 1, has highly surprising properties.

In FIG. 2, a step can be seen in the profile of the thermal expansion coefficient as a function of temperature at a temperature somewhat above 650° C., at about 670° C., which is at the glass transition temperature $T_g$ of the at least partially crystallized glass, in particular with the composition of Material 1, or with compositions which are in a range as indicated for the preferred at least partially crystallizable glasses. This step is attributed to a residual glass phase which shows that the crystallization temperature and the maximum operating temperature are far beyond $T_g$ and that the glassy phase will not be present in a solid, but in particular in a liquid form.

Nevertheless, very surprisingly, the compressive stress described above is maintained in the aforementioned temperature ranges, and the soft residual glass phase is not pressed out, neither by the compressive stress nor by external impact.

From the data of FIG. 2 it could be assumed that with the thermal behavior denoted by reference numeral 39 in FIG. 5 it would not be possible to achieve sufficient strengths for the purposes of the present invention above the glass transition temperature $T_g$.

In the present method, during the cooling of the arrangement of carrier body, glassy, at least partially crystallizable or at least partially crystallized starting material, and preferably functional element, the carrier body will subject the at least partially crystallized glass 3 to a compressive stress of greater than or substantially equal to zero, at a temperature from at least 20° C. up to more than 450° C., preferably at a temperature from at least 20° C. up to more than 550° C., more preferably at a temperature from at least 20° C. to more than 650° C., and yet more preferably at a temperature from at least 10° C. to more than 750° C., and most preferably at a temperature from at least 10° C. to more than 900° C., depending on the choice of the materials and the degree of crystallization.

After this cooling, these compressive stresses are preserved permanently and under continuous operation in the assembly of carrier body, at least partially crystallized glass, and preferably also functional element.

In the case of a lead-through or connecting element produced in this manner, the maximum operating temperature in particular corresponds substantially to the inversion temperature of the lead-through or connecting element, with a deviation of +/−20%, wherein with the above method procedure the inversion temperature is that temperature at which the compressive stress exerted by the carrier body on the at least partially crystallized glass material assumes the value of zero, and wherein the maximum operating temperature is in a range of more than 450° C., in particular up to 950° C., and preferably up to 1000° C. or more, preferably up to 1100° C., more preferably up to 1200° C.

Furthermore suitable as a material for the functional element, besides the aforementioned NiFe alloy, or CF25, i.e. the FeCo alloy, are in particular beryllium-copper alloys, Kovar, or Inconel, such as, e.g., Inconel 690, Inconel 625, and others.

Further preferred embodiments which may likewise be produced by the above method will now be described below.

Figure 6:
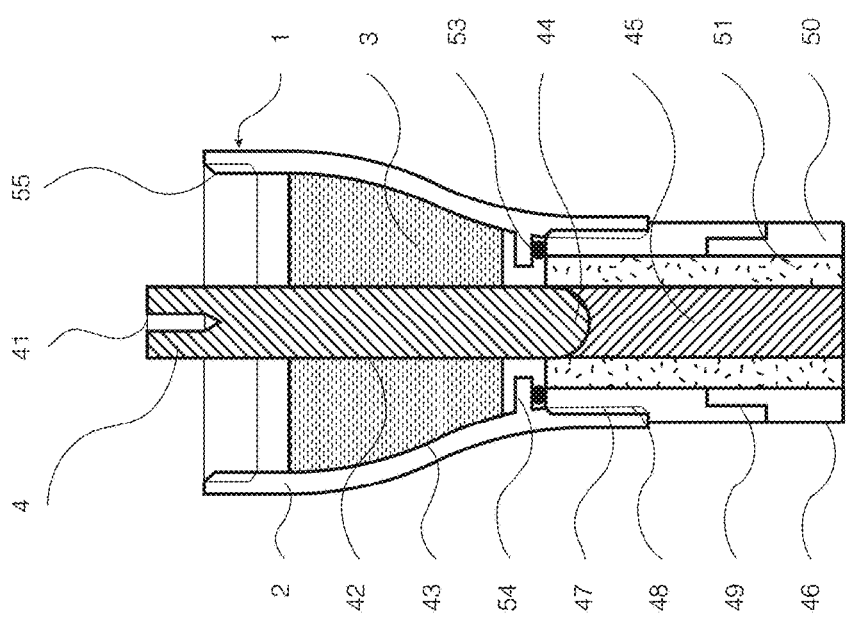
FIG. 6 is a highly simplified schematic cross-sectional view of a second embodiment of a lead-through or connecting element, with a female plug-in connector in which a mineral-insulated cable is connected to the lead-through or connecting element.

Referring to FIG. 6 which shows a highly schematic cross-sectional view of a second embodiment of a lead-through or connecting element in which the functional element 4 comprises a female plug-in connector 41.

The lead-through or connecting element denoted by reference numeral 1 as a whole, comprises an assembly consisting of a carrier body 2 which comprises a high-temperature alloy as described above, a functional element 4, and an at least partially crystallized glass 3, with the at least partially crystallized glass 3 arranged between a portion 42 of the functional element 4 and a portion 43 of the carrier body 2.

Other than in the first exemplary embodiment described above, the outer circumference of the at least partially crystallized glass 3 does not assume a cylindrical shape in this embodiment, but rather a radially tapering shape, which offers advantages in tightly packed arrangements with a multiplicity of the lead-through or connecting elements described herein, if these are employed, as will be described in more detail below with reference to FIG. 8, for example, as a lead-through for a containment, and if further connections are to be established in close proximity.

At the end opposite to female plug-in connector 41, the functional element 4 is connected, through a brazed joint 44, to a copper conductor 45 of a mineral-insulated cable 46.

The carrier body 2 has associated therewith a fastening means 47 for a further functional unit, in this case for the mineral-insulated cable 46, in the form of an internal thread 47 which is provided at the lower end of carrier body 2 and into which an external thread 48 of an end sleeve 49 of the cable sheath 50 of the cable 46 which is preferably insulated with magnesium oxide as a temperature-resistant insulating material 51, engages in form-fitting manner.

An end face of end sleeve 49 urges a high-temperature metallic gasket 53 against an annular shoulder 54 of the carrier body 2, which gasket may be implemented as a gas-filled annular tubular gasket or as a single-crystal metal gasket, for example, and as a result thereof a mechanically robust as well as hermetically tight connection is established between the lead-through and connecting element 1 and the mineral-insulated cable 46.

Instead of the fastening means embodied as an external thread 48 and which is associated with the further functional unit comprising the mineral-insulated cable 46 arranged on the carrier body 2, and which is screwed to the internal thread 47 that is associated with the carrier body 2 as a fastening means, it is likewise possible to use further or alternative forms of attachment, such as welding, soldering with a metallic solder, brazing with a metallic solder, a glass solder, screws, latching means, rivets, crimping, thermal shrinking, chemical bonding.

For certain applications, the conductor 45 of mineral-insulated cable 46 may advantageously comprise a thermal or heating element, instead of or in addition to the copper conductor 45.

At the end adjacent to female plug-in connector 41, the carrier body 2 has a fastening means in the form of an internal thread 55 for yet another unit that is not shown in FIG. 6.

Such a further unit may comprise the arrangement shown in FIG. 1 with the substantially cylindrical holder 7 and the contact sockets 6 disposed therein, as a slightly modified configuration, and as an alternative to the coupling nut 13 with internal thread it is possible to use a correspondingly modified coupling nut with external thread, which is however not shown in FIG. 6, for establishing a mechanically robust connection with the connecting element 1. Since in this case the interior of the carrier body 2 would be larger than illustrated in FIG. 1, the diameter of the cylindrical holder 7 may also be increased accordingly.

In this way, a plug-in connector element 41 is provided, which has associated therewith a further element 6 of a further unit, which can be connected to this element. Such an arrangement can be useful in application fields where high mechanical and thermal loads are encountered, but no atmospheric pressure loads are to be expected.

Figure 7:
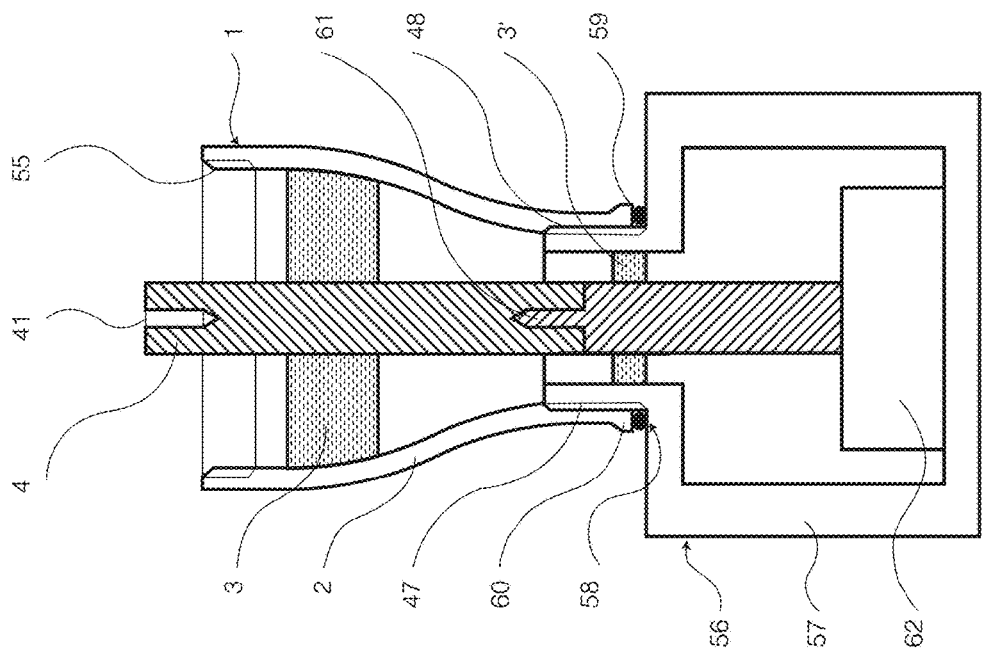
FIG. 7 is a highly simplified schematic cross-sectional view of a third embodiment of a lead-through or connecting element, with a functional unit that is connected in hermetically sealed manner to the lead-through or connecting element by a material bond and/or in form-fitting manner.

Referring now to FIG. 7 which shows a greatly simplified schematic cross-sectional view of a third embodiment of a lead-through or connecting element 1, with a functional unit 56 that is connected hermetically tightly to the lead-through or connecting element, by a material bond and/or in a form-fitting manner.

Functional unit 56 comprises a housing 57 which is provided with a sealing surface 58 below the external thread 48 of the housing 57, for a high-temperature metallic gasket 59 which, at the opposite end thereof, is pressed in hermetically sealing manner against an annular shoulder 60 of the carrier body 2.

The housing 57 of functional unit 56 can be attached to the carrier body 2 by screwing, and the cylindrical male-female arrangement 61 is designed so that the twisting resulting during screwing is tolerated.

In this case, the carrier body 2 comprising the high-temperature alloy, which exerts the compressive stress on the crystallized glass 3, hermetically seals the interface between carrier body 2 and crystallized glass 3, and the fastening means comprising internal thread 47, external thread 48, annular shoulder 60, high-temperature metallic gasket 59 and sealing surface 58 on housing 56 hermetically seal the connection to the functional unit comprising the housing 57.

In this embodiment, the at least partially crystallized glass 3' need not be used for the housing 57, but may be advantageous in further applications which will be described below.

Housing 57, when embodied as a sensor housing and/or actuator housing, may have shapes significantly different from the purely schematic view of FIG. 7, which can be adapted to the respective conditions.

As an actuator housing, for example, the housing 57 may have associated therewith or may accommodate a linear and/or rotary drive for solid-state and/or fluid media.

As a sensor housing, the housing 57 may have associated therewith or may accommodate an optical, electrical, in particular inductive, capacitive and/or piezoelectric sensor.

These sensors and/or actuators are represented only schematically by the unit denoted by reference numeral 62 in FIG. 7.

Instead of or in addition to sensors or actuators, housing 57 may accommodate one or a plurality of energy storage systems, for example as an emergency power supply in critical or potentially hazardous environments.

Referring now to FIG. 8 which shows a highly schematic cross-sectional view of a fourth embodiment of a lead-through or connecting element which is retained in a containment 63 in hermetically sealed manner. This containment may be part of the envelope of a device in which toxic substances may be present, for example.

This embodiment, again, shows a female plug-in connector 41, by way of example, in which a mineral-insulated cable is connected to the lead-through or connecting element which, however, need not be hermetically sealed against the carrier body, since this sealing is provided by the containment 63 in conjunction with the carrier body 2, as will be described in more detail below.

An annular shoulder 64 of the carrier body 2 is arranged in a radially symmetrical recess 65 of the containment 63 which is made of metal in this embodiment, and is held in mechanically robust and hermetically tight manner on the containment 63, by a welded or brazed joint 66.

Alternatively, in applications which are subjected to less vibrations, the nut 70 may compress a high-temperature metallic gasket 67 in hermetically tight manner between the annular shoulder 64 of carrier body 2 and the radially symmetrical recess 65 of containment 63.

If the external thread 48 of the housing 57 shown in FIG. 7 is appropriately dimensioned such that the latter can be screwed into the internal thread 55 of carrier body 2 of the present embodiment, this housing 57 can be attached by screwing to the lead-through element 1 as a further unit. When used like this, the at least partially crystallized glass 3 can seal the housing 57 hermetically against the exterior of the housing 57 and can be introduced into the housing 57 as described before for the carrier body 2 by the method described above.

Referring to FIG. 9, a highly schematic cross-sectional view of a fifth embodiment of a lead-through or connecting element will now be described below, in which the functional element of the lead-through or connecting element 1 comprises a passage for a fluid connection 68 or an electromagnetic waveguide 68.

In this embodiment, the functional element 4 which is in the form of a hollow cylinder 69 has connected thereto, for example by a brazed joint 71, a further cylindrical sheath which may be made of steel and may provide a fluid connection 68, or else an electromagnetic waveguide 68 for electromagnetic radiation, for example, in particular for a high-frequency connection. Furthermore, an optical connection in the form of optical waveguides may also be arranged in this assembly, or the reflective interior of the waveguide 68 may define a portion of this connection.

The aforementioned fluid connections may comprise hydrogen passages, in particular in power generation systems, and also in internal combustion engines.

Figure 10:
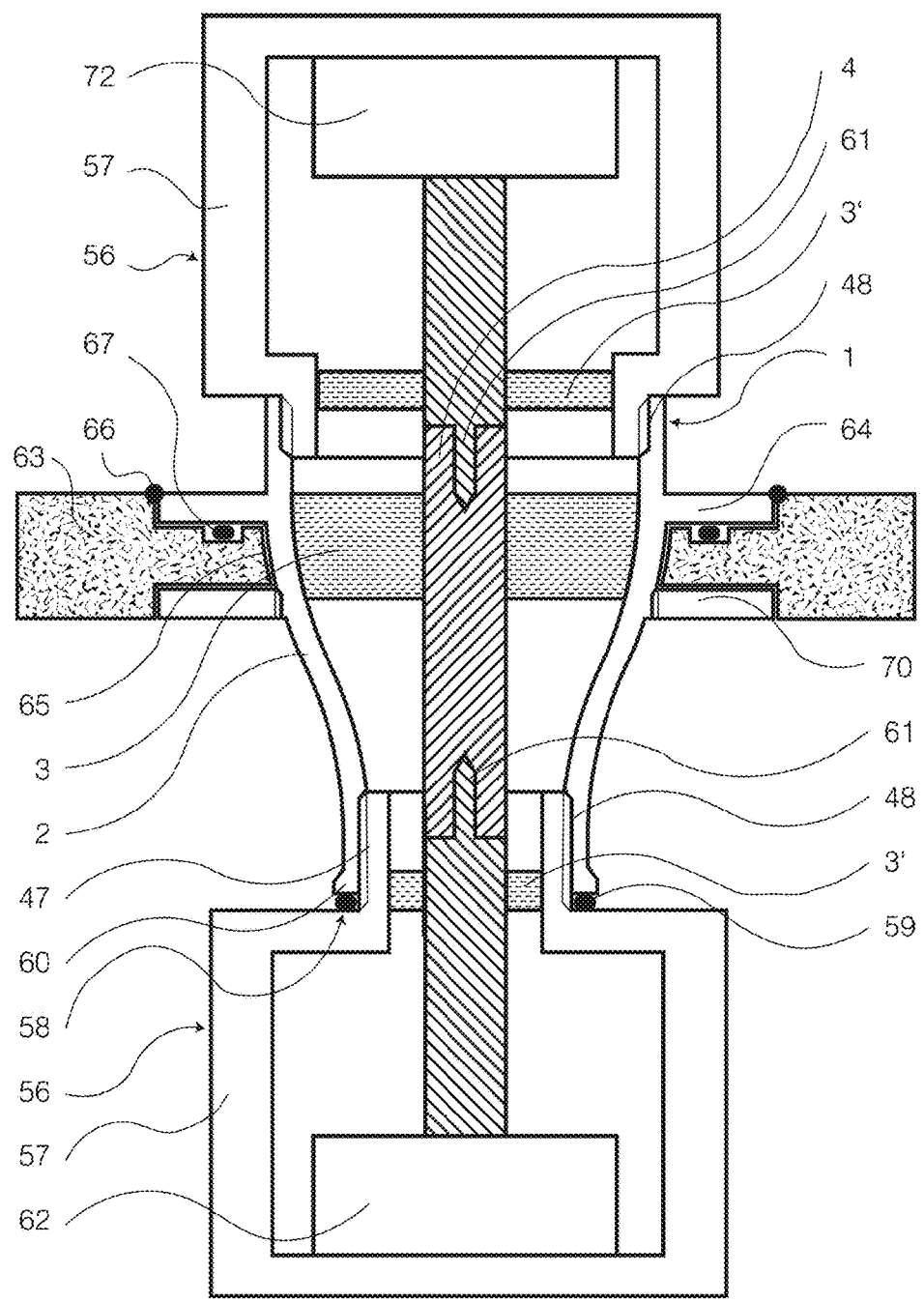
FIG. 10 is a highly simplified schematic cross-sectional view of a sixth embodiment of a lead-through or connecting element, which is retained in a containment preferably in hermetically sealed manner, with a female plug-in connector which has connected to the lead-through or connecting element thereof both measuring electronics and a sensor of a measuring device that is arranged within the containment.

FIG. 10 is a highly simplified schematic cross-sectional view of a sixth embodiment of a lead-through or connecting element 1, which is retained in a containment 63 preferably in hermetically sealed manner, with the functional element 4 having a female plug-in connector on each of its end faces, for example as part of a male-female connector assembly 61.

In this embodiment, measuring electronics 72 is arranged in the housing 57 of the further unit which is located outside the containment 63. In this way, the measuring electronics can be operated essentially independently of radiation which possibly occurs within the containment 63.

A sensor 62 located within the containment has a housing 57 that is connected to the lead-through or connecting element 1, so that with this arrangement a measuring device is provided which can be reliably operated even in emergency or incident situations and can provide sensor readings from the interior of the containment 63.

Such a measuring device exhibits high-temperature resistance, is resistant in case of incidents at least for its components located within the containment 63, provides high electrical insulation resistances at high temperatures, and provides long service lives, even at extremely high temperatures.

Particularly advantageous are the high resistances of the preferred at least partially crystallizable glass, which are provided even at very high temperatures. As in this embodiment, the further embodiments described herein also have electrical resistance values which reliably exceed the values required according to GOST R53310-2009 "ELECTRICAL PENETRATIONS, HERMETIC INPUTS AND FEEDTHROUGHS OF POWER RAILS".

The lead-through or connecting elements 1 described above generally provide a high degree of safety in the event of incidents. For example, the safety requirements for steam incidents according to which a steam pressure of 10 bar at 180 to 200° C. must be withstood, can be reliably met. Also, the connecting elements described above reliably withstand the stresses expected for a core melt accident with a thermal permanent load of 700° C. for at least 72 hours.

Furthermore, these lead-through or connecting elements 1 also comply with the respective safety regulations for fire events, such as, for example, flue gas tests. Rating R 120/EI 60 of GOST 30247.0-94 is achieved and even exceeded, with significantly better properties.

Referring now to FIG. 11 which is a greatly simplified schematic cross-sectional view of a power generation system denoted by reference numeral 73 as a whole. Power generation system 73 comprises a housing 74 and an encapsulation 75. Both the housing 74 and the encapsulation 75 define a containment 63 in the sense of the present description of the embodiments according to the invention, which use a lead-through or connecting element 1 in each case in order to provide any one of the above-described lead-throughs or connections. In a preferred embodiment, the lead-through or connecting elements 1 are interconnected by a mineral-insulated (MI) cable 18. The connecting element 1 is in particular suitable for providing a lead-through in the primary circuit of the reactor, in particular, as illustrated herein, lead-throughs through the reactor pressure vessel, for example for power supply to the control rods.

Furthermore, other preferred embodiments preferably comprise sensor elements including semiconductor chips which are directly applied on the glass surface.

A particularly preferred embodiment, for example, comprises a Wheatstone pressure sensor with a measuring bridge and/or a layer that has a lower coefficient of thermal expansion than the carrier body 2, and a through-opening in the at least partially crystallizable glass 3 underneath the sensor, through which differential pressures can be detected by the sensor.

Furthermore advantageous in these embodiments employing sensors are the electrical properties of the at least partially crystallizable glass 3, which due to the high insulating capacity is able to reduce or even completely prevent leakage currents which could falsify the measurement.

The lead-through or connecting elements 1 described above are particularly advantageously used in environments where considerable damage might occur to humans and facilities in the case of failure of conventional lead-through or connecting elements, for example in oil and/or natural gas drilling or exploration equipment, or in a power generation or energy storage system comprising a housing, or in an encapsulation of a power generation system or an energy storage system or of a reactor or of a storage device for toxic and/or harmful matter, in particular as a lead-through means within a containment of a reactor, or as a lead-through means through the containment of a reactor, in particular of a nuclear reactor, or in a spacecraft or in a space exploration vehicle, or in a housing of a sensor and/or an actuator.

The invention and the foregoing description can also be characterized and/or summarized by the following statements which form part of the entire disclosure.

Statement 1: In a lead-through or connecting element according to the present disclosure of preferred embodiments, the carrier body 2 comprising the high-temperature alloy is able to exert a compressive stress of greater than or substantially equal to zero, preferably at a temperature from at least 10° C. up to the crystallization temperature $T_K$ of the at least partially crystallized glass.

Statement 2: In a lead-through or connecting element according to the present disclosure of preferred embodiments, the factor $F_{CTE}$ can be in a range from 1.06 to 3.5.

Statement 3: In a lead-through or connecting element according to the present disclosure, the coefficient of thermal expansion $CTE_G$ of the at least partially crystallized glass can be constant at a temperature within a temperature interval above the inversion temperature.

Statement 4: With a lead-through or connecting element according to the present disclosure of preferred embodiments, the temperature which the lead-through or connecting element is subjected to in the operating state and/or in the event of an incident can be more than 650° C., preferably between 700° C. and 1200° C., without thereby substantially impairing the mechanical properties, the electrical resistance and the hermeticity thereof.

Statement 5: In a lead-through or connecting element according to the present disclosure of preferred embodiments, the fastening means of the further functional unit arranged on the carrier body 2 can be connected to the fastening means by welding, soldering with a metallic solder, brazing with a metallic solder, by a glass solder, screws, latching means, rivets, by crimping, thermal shrinking, chemical bonding, or by an intermediate sealant, in particular a metallic sealant.

Statement 6: In a lead-through or connecting element according to the present disclosure of preferred embodiments, the functional element 4 can comprise at least one releasably connectable, in particular plug-in connectable element which has associated therewith a further element connectable thereto of a further unit.

Statement 7: In a lead-through or connecting element according to the present disclosure of preferred embodiments, the at least one releasably connectable, in particular plug-in connectable element and the element associated with the plug-in connectable element can provide a connection for electrical current, a form-fitting waveguide assembly in the form of a male-female connector assembly, a connection for optical waveguides, or a fluid passage.

Statement 8: With a lead-through or connecting element according to the present disclosure of preferred embodiments, an element of the further unit connectable to the functional element can have associated therewith at least one fastening portion, the fastening portion being associated with a fastening portion of the lead-through or connecting element.

Statement 9: With a lead-through or connecting element according to the present disclosure of preferred embodiments, the lead-through or connecting element can have associated therewith a functional unit with an actuator housing that has associated therewith a linear and/or rotary drive for solid-state and/or fluid media.

Statement 10: In a lead-through or connecting element according to the present disclosure of preferred embodiments, the sensor housing can have associated therewith an optical, electrical, in particular inductive, capacitive, and/or piezoelectric sensor.

Statement 11: In a lead-through or connecting element according to the present disclosure of preferred embodiments, the sheath in the functional unit can surround a fluid passage or define a portion thereof, the conductor sheath can surround or define a portion of an electrical, electromagnetic, in particular high-frequency connection comprising a waveguide, and/or of an optical connection.

Statement 12: In a lead-through or connecting element according to the present disclosure of preferred embodiments, the conductor sheath can surround or define a portion of an electrical, electromagnetic, in particular high-frequency connection comprising a waveguide, and between the conductor sheath made of steel and the electrical, electromagnetic or waveguide conductor, a mineral insulating material, in particular magnesium oxide, can be disposed.

Statement 13: In a lead-through or connecting element according to the present disclosure of preferred embodiments and in accordance with statement 7, a conductor as a connection for electrical current can comprise a thermal or heating element.

Statement 14: In a lead-through or connecting element according to the present disclosure of preferred embodiments, the functional unit can comprise a mechanical, electrical, and/or electrochemical energy storage.

Statement 15: With a lead-through or connecting element according to the present disclosure of preferred embodiments, a measuring device comprising this lead-through or connecting element can have connected to this lead-through or connecting element 1 both the measuring electronics 72 and a sensor 62 that is arranged within a containment 63.

Statement 16: In a method for producing a lead-through or connecting element according to the present disclosure of preferred embodiments, the temperature $T_K$ at which the carrier body exerts a compressive stress of substantially zero on the at least partially crystallized glass can be defined by adjusting the temperature of the arrangement consisting of carrier body, at least partially crystallizable glass and preferably also functional element, at which the at least partially crystallizable glass at least partially crystallizes.

Statement 17: In a method for producing a lead-through or connecting element according to the present disclosure of preferred embodiments, the temperature $T_K$ can differ from the temperature at which the at least partially crystallizable or at least partially crystallized starting material fuses to the carrier body and at which the at least partially crystallizable or at least partially crystallized starting material preferably also fuses to the functional element.

Statement 18: In a method for producing a lead-through or connecting element according to the present disclosure of preferred embodiments, the temperature $T_K$ can be more than 450° C., preferably more than 550° C., more preferably more than 650° C., and yet more preferably more than 750° C., and most preferably more than 900° C.

Statement 19: In a method for producing a lead-through or connecting element according to the present disclosure of preferred embodiments, the at least partially crystallized glass 3 can be a glass or a glass ceramic or a glass-based crystallized material with a volume resistivity of more than $1.0 \times 10^{10}$ Ωcm at a temperature of 350° C., and the glass or the glass ceramic or the glass-based crystallized material can contain the following components on an oxide basis, in mol %:

$SiO_2$ 25-55
$B_2O_3$ 0.1-15
$Al_2O_3$ 0-15
MO 20-50
$M_2O$ 0-<2,
    wherein MO is selected from the group consisting of MgO, CaO, SrO, BaO, individually or in any combination thereof, and wherein $M_2O$ is selected from the group consisting of $Li_2O$, $Na_2O$, $K_2O$, individually or in any combination thereof.

Statement 20: In a method for producing a lead-through or connecting element according to the present disclosure of preferred embodiments, the carrier body may comprise a high-temperature alloy having a coefficient of thermal expansion $CTE_H$ which at least within a range from 10° C. up to at least the temperature $T_K$ is greater than the coefficient of thermal expansion of the at least partially crystallized glass, $CTE_G$.

Statement 21: For a variety of applications, the at least partially crystallizable glass itself can act or be used as the functional element, for example if it is transmissive or partially transmissive to optical, acoustic, and/or electromagnetic signals.

As far as the functional element is mentioned as being preferred in the above description and in the claims, this is intended to indicate within the sense of the present disclosure that the at least partially crystallized glass itself can also function as a functional element for certain applications and that thus a further functional element need not be present physically in addition thereto for these particular applications.

LIST OF REFERENCE NUMERALS

1 Lead-through or connecting element
1' Lead-through or connecting element
2 Carrier body
2' Carrier body
3 Glass, at least partially crystallizable or crystallized
3' Glass, at least partially crystallizable or crystallized
3''' Crystallizable glass
4a Functional element
4b Functional element
4a' Functional element
4b' Functional element
5 Contact socket
6 Contact socket
7 Substantially cylindrical holder
8 Annular shoulder
9 Flange surface
10 High-temperature metallic gasket
11 Annular groove
12 End face
13 Coupling nut
14 Internal thread of coupling nut
15 External thread of radial extension of carrier body 1'
16 Opening
17 Cable sheath of MI cable 18
18 Mineral-insulated cable
19 Welded or brazed joint
20 Opening
21 Cable sheath of MI cable 22
22 Mineral-insulated cable
23 Welded or brazed joint
24 Copper conductor of mineral-insulated cable 18
25 Copper conductor of mineral-insulated cable 18
26 Copper conductor of mineral-insulated cable 22
27 Copper conductor of mineral-insulated cable 22
28 Crimped or brazed joint
29 Crimped or brazed joint
30 Crimped or brazed joint
31 Crimped or brazed joint
32 Carrier body
33 Glass
34 Functional element, cylindrical tube as fluid passage
35 Relative thermal expansion of glass 33
36 Relative thermal expansion of the steel of the carrier body
37 Compressive and tensile stresses resulting from relative thermal expansions
38 Curve of thermal expansion coefficient $CTE_H$ of metallic high-temperature alloy Inconel 690
39 Curve of thermal expansion coefficient $CTE_G$ of at least partially crystallizable or at least partially crystallized glass G018-385
40 Curve of thermal expansion coefficient $CTE_H$ of metallic high-temperature alloy Inconel 690 with values shifted by an amount $CTE_K$
41 Female plug-in connector
42 Portion of functional element 4
43 Portion of carrier body 2
44 Brazed joint
45 Copper conductor of a mineral-insulated cable 46
46 Mineral-insulated cable
47 Internal thread as a fastening means for a further functional unit
48 External thread of end sleeve 49 of cable sheath 50
49 End sleeve 49 of cable sheath 50
50 Cable sheath
51 Magnesium oxide as temperature-resistant insulating material
52 Internal thread
63 High-temperature metallic gasket
54 Annular shoulder of carrier body 2
55 Internal thread for attaching a further unit
56 Functional unit
57 Housing of functional unit 56
58 Sealing surface on housing 56
59 High-temperature metallic gasket
60 Annular shoulder of carrier body 2
61 Male-female connector assembly
62 Sensors and/or actuators
63 Containment
64 Annular shoulder of carrier body 2
65 Radially symmetrical opening of containment 63
66 Brazed joint
67 High-temperature metallic gasket
68 Fluid passage or waveguide
69 Hollow cylinder
70 Nut
71 Brazed joint
72 Measuring electronics
73 Power generation system
74 Housing
75 Encapsulation

What is claimed is:

1. A method for producing a lead-through or connecting element, comprising the method steps of:
   providing an at least partially crystallizable starting material;
   providing a carrier body having an interior volume;
   arranging at least a portion of the starting material in the interior volume to form an assembly;
   heating the assembly until a temperature is reached at which the starting material bears against and fuses to the portion of the carrier body; and
   cooling the assembly until the starting material forms at least partially crystallizable glass,
   wherein, during the cooling of the assembly, the carrier body subjects the at least partially crystallizable glass to a compressive stress of greater than or equal to zero at a temperature from at least 10° C. to more than 450° C., and
   wherein the assembly has an inversion temperature that corresponds to a maximum operating temperature with a deviation of +/−20%, wherein the maximum operating temperature is above 450° C.

2. The method of claim 1, further comprising adjusting the temperature of the assembly until the starting material at least partially crystallizes, wherein the cooling step comprises cooling the assembly until the starting material forms at least partially crystallized glass.

3. The method of claim 1, further comprising arranging a functional element in the assembly so that at least a portion of the functional element is in the interior volume and is surrounded by the starting material.

4. The method of claim 3, wherein the heating further comprises heating the assembly until the starting material bears against and fuses to the functional element.

5. The method of claim 1, wherein the temperature is from at least 10° C. to more than 900° C.

6. The method of claim 5, wherein, when the temperature exceeds 950° C., a coefficient of thermal expansion $CTE_G$ of the at least partially crystallized glass is smaller than a coefficient of thermal expansion $CTE_H$ of the high-temperature alloy by a factor $F_{CTE}$ that is greater than 1.06, except for a deviation of about 5%.

7. The method of claim 2, wherein, during the cooling of the assembly, the carrier body subjects the at least partially crystallized glass to a compressive stress of greater than or equal to zero at a temperature from at least 10° C. to more than 450° C.

8. The method of claim 7, wherein the temperature is from at least 10° C. to more than 900° C.

9. The method of claim 7, wherein, when the temperature exceeds 950° C., a coefficient of thermal expansion $CTE_G$ of the at least partially crystallized glass is smaller than a coefficient of thermal expansion $CTE_H$ of the high-temperature alloy by a factor $F_{CTE}$ that is greater than 1.06, except for a deviation of about 5%.

10. The method of claim 1, wherein the maximum operating temperature is up to 1200° C.

11. The method of claim 1, wherein the at least partially crystallized glass comprises at least one crystal phase and at least one amorphous residual glass phase with a glass transition temperature $T_g$, the at least one crystal phase supporting the at least partially crystallized glass at temperatures above the glass transition temperature $T_g$ to prevent the at least partially crystallized glass from being pressed out of the carrier body.

12. The method of claim 1, wherein the at least partially crystallized glass comprises a material selected from the group consisting of a glass, a glass ceramic, and a glass-based crystallized material, the material having a volume resistivity of more than $1.0 \times 10^{10}$ Ωcm at a temperature of 350° C.

13. The method of claim 12, wherein the material comprises the following components on an oxide basis, in mol %:

$SiO_2$ 25-55;
$B_2O_3$ 0.1-15;
$Al_2O_3$ 0-15;
MO 20-50; and
$M_2O$ 0-<2,
wherein MO is selected from the group consisting of MgO, CaO, SrO, and BaO, and any combinations thereof, and
wherein $M_2O$ is selected from the group consisting of $Li_2O$, $Na_2O$, $K_2O$, and any combinations thereof.

* * * * *